United States Patent
Chen

(10) Patent No.: US 9,749,434 B2
(45) Date of Patent: Aug. 29, 2017

(54) DISPLAYING A NETWORK PRODUCT AND LIFETIME OF THE NETWORK PRODUCT USING BEHAVIOR EVENT

(71) Applicant: TENCENT TECHNOLOGY (SHENZHEN) COMPANY LIMITED, Shenzhen, Guangdong (CN)

(72) Inventor: Min Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/106,576

(22) PCT Filed: Dec. 25, 2014

(86) PCT No.: PCT/CN2014/094983
§ 371 (c)(1),
(2) Date: Jun. 20, 2016

(87) PCT Pub. No.: WO2015/096781
PCT Pub. Date: Jul. 2, 2015

(65) Prior Publication Data
US 2017/0041409 A1 Feb. 9, 2017

(30) Foreign Application Priority Data
Dec. 25, 2013 (CN) .......................... 2013 1 0724107

(51) Int. Cl.
*H04L 12/18* (2006.01)
*H04L 29/08* (2006.01)
(Continued)

(52) U.S. Cl.
CPC ............. *H04L 67/22* (2013.01); *G06Q 30/02* (2013.01); *H04L 12/1859* (2013.01);
(Continued)

(58) Field of Classification Search
CPC ...................................................... H04L 51/32
See application file for complete search history.

(56) References Cited

U.S. PATENT DOCUMENTS 8,428,453 B1 * 4/2013 Spiegel .............. H04N 5/23216
396/299
9,396,354 B1 * 7/2016 Murphy .............. G06F 21/6245
(Continued)

FOREIGN PATENT DOCUMENTS

CN 102316362 A 1/2012
CN 103368988 A 10/2013

OTHER PUBLICATIONS

International Search Report for International Application No. PCT/CN2014/094983, dated Apr. 1, 2015, 2 pages.
(Continued)

*Primary Examiner* — Jimmy H Tran
(74) *Attorney, Agent, or Firm* — Knobbe Martens Olson & Bear LLP

(57) ABSTRACT

A network product display method, apparatus, system, server and terminal are disclosed in the present invention, and belong to the field of computer technology. The method includes: collecting behavior events transmitted by at least one terminal, and the behavior events are generated according to operations on the displayed network product; adjusting the lifetime of the network product according to the behavior events, and the lifetime is the remaining display time of the network product. The present invention, by collecting the behavior events generated according to the operations on the network product and adjusting the lifetime of the network product according to the collected behavior events, solves the problem that lots of server resources are occupied when more network products are released by the server, and achieves the effect that the server resources (Continued)

occupation is reduced and the survival of the fittest of the network products is realized.

13 Claims, 15 Drawing Sheets

(51) Int. Cl.
*G06Q 30/02* (2012.01)
*H04L 29/06* (2006.01)

(52) U.S. Cl.
CPC .............. *H04L 67/10* (2013.01); *H04L 67/18* (2013.01); *H04L 67/42* (2013.01)

(56) References Cited

U.S. PATENT DOCUMENTS

| | | | | |
|---|---|---|---|---|
| 2010/0318484 A1* | 12/2010 | Huberman | ............. | G06Q 30/02 706/46 |
| 2011/0218946 A1* | 9/2011 | Stern | ................... | H04L 12/1859 706/12 |
| 2011/0225290 A1* | 9/2011 | Kansal | ................ | H04L 67/1097 709/224 |
| 2012/0158461 A1* | 6/2012 | Aldrey | ............... | G06Q 30/0201 705/7.35 |
| 2013/0091147 A1* | 4/2013 | Kim | ................. | G06F 17/30663 707/748 |
| 2013/0144869 A1* | 6/2013 | Shalabi | ................ | G06F 17/211 707/722 |
| 2014/0129953 A1* | 5/2014 | Spiegel | ............... | G06F 21/6245 715/741 |
| 2014/0143228 A1* | 5/2014 | Blue | ................. | G06F 17/30867 707/709 |
| 2014/0143405 A1* | 5/2014 | Pavlidis | ............. | G06Q 30/0202 709/224 |
| 2014/0146052 A1* | 5/2014 | Takamura | ............... | G06F 13/00 345/440 |
| 2014/0244747 A1* | 8/2014 | Aggarwal | ............... | H04L 67/22 709/204 |
| 2014/0358885 A1* | 12/2014 | Zhou | ................. | G06F 17/30873 707/708 |
| 2015/0067048 A1* | 3/2015 | Kannan | ................... | H04L 65/40 709/204 |
| 2015/0193889 A1* | 7/2015 | Garg | ................. | G06Q 30/0251 705/14.49 |
| 2015/0381543 A1* | 12/2015 | Hong | ..................... | H04W 4/02 709/203 |
| 2016/0099901 A1* | 4/2016 | Allen | ..................... | H04L 51/10 709/206 |
| 2016/0156978 A9* | 6/2016 | Aaron | .................... | H04H 60/33 725/14 |
| 2017/0076319 A1* | 3/2017 | Ballard | ............. | G06Q 30/0246 |

OTHER PUBLICATIONS

International Preliminary Report on Patentability and Translation of Written Opinion of the International Searching Authority for International Application No. PCT/CN2014/094983, mailed Apr. 1, 2015, 9 pages.

* cited by examiner

DISPLAYING A NETWORK PRODUCT AND LIFETIME OF THE NETWORK PRODUCT USING BEHAVIOR EVENT

This application claims priority to Chinese Patent Application No. 201310724107.6, entitled "Network product display method, apparatus and system" filed on Dec. 25, 2013, which is incorporated by reference in its entirety.

BACKGROUND

Field

The present disclosure relates to computer technologies, and more particularly, to a network product display method, apparatus, system, server and terminal.

Description of the Related Art

Network products may include products depending on a network, e.g. a network video, a network picture, a network e-book, a downlink link of an installation package and etc. Network companies may release network products on websites. Along with the increasing demand for network products, competition among network companies is increasingly fierce. In order to enhance competitiveness, network companies usually choose to open more network products to users.

In practical applications, after producing or obtaining a network product, the network company may release the network product on a website, so that the user may, via a terminal used by the user, access the website, download the network product from the website and display the network product. For example, after a video is newly obtained, the network company may release the video on a video website. The terminal used by the user may access the video website, download the video from the video website and play the video, and the user may watch the video via the terminal.

In a procedure of implementing the present invention, the inventor discovers the following defects of related technologies. When many network products are released on the website, numerous resources of a server of the website are occupied, thereby causing a lot of burdens to the server.

SUMMARY

For the purpose of solving the problem in the present technologies that a lot of burdens are caused to a server since numerous resources of the server are occupied when many network products are displayed by the server.

A first aspect of the application is a network product display method which includes:

collecting a behavior event transmitted by at least one terminal; the behavior events being generated according to an operation on a network product displayed;

adjusting a lifetime of the network product according to the collected behavior event; the lifetime being remaining display time of the network product.

A second aspect of the application is a network product display method which includes: generating a behavior event according to an operation on a network product displayed; sending the behavior event to a server; the server being used to adjust a lifetime of the network product according to the collected behavior event of the network product; the lifetime being remaining display time of the network product.

A third aspect of the application is a network product display apparatus which includes: a collecting module, to collect a behavior event transmitted by at least one terminal, the behavior event being generated according to an operation on a displayed network product; and a first adjusting module, to adjust a lifetime of the network product according to the behavior event collected by the collecting module, the lifetime being remaining display time of the network product.

A fourth aspect of the application is a network product display apparatus which includes: an event generating module, to generate a behavior event according to an operation on a displayed network product; and a third sending module, to send the behavior event to the server; the server being used to adjust a lifetime of the network product according to the collected behavior event of the network product; the lifetime being remaining display time of the network product.

A fifth aspect of the application is a network product display system which includes: a server and at least one terminal; the server comprises a network product display apparatus described in the third aspect; the terminal comprises a network product display apparatus described in the fourth aspect.

A sixth aspect of the application is a server which includes: a CPU, a network interface unit and system storage; wherein system storage stores program codes, the CPU is to call the program codes stored in the system storage via a system bus to execute processing of: collecting a behavior event transmitted by at least one terminal; the behavior events being generated according to an operation on a network product displayed; adjusting a lifetime of the network product according to the collected behavior event; the lifetime being remaining display time of the network product.

A seventh aspect of the application is a terminal which includes: a CPU, a network interface unit, a display and system storage; wherein system storage stores program codes, the CPU is to call the program codes stored in the system storage via a system bus to execute processing of: generating a behavior event according to an operation on a network product displayed; sending the behavior event to a server; the server being used to adjust a lifetime of the network product according to the collected behavior event of the network product; the lifetime being remaining display time of the network product.

The advantages brought by the technical solutions of the present disclosure are as follows.

The behavior event is generated according to the operation on the displayed network product, the server collects the behavior event sent by the terminals and adjusts the lifetime of the network product according to the collected behavior events, thereby solving the problem that a lot of burdens are caused to the server since numerous resources of the server are occupied when many network products are displayed by the server. In addition, if the network product is unpopular, the lifetime of the network product may be reduced according to the operation performed on the network product by the user, and the network product may be canceled when the lifetime is lower than a preconfigured lifetime threshold, thereby reducing the occupation of the service resources and the survival of the fittest of the network products is realized automatically.

BRIEF DESCRIPTION OF THE DRAWINGS

In order to describe technical solutions of examples of the present invention clearly, accompanying drawings used in examples of the present disclosure are described below. The described accompanying drawings are parts of examples of the present invention. Other accompanying drawings may be

DETAILED DESCRIPTION

In order to make the object, technical solution and merits of the present invention clearer, the present invention will be illustrated in detail hereinafter with reference to the accompanying drawings and specific examples.

Figure 1:
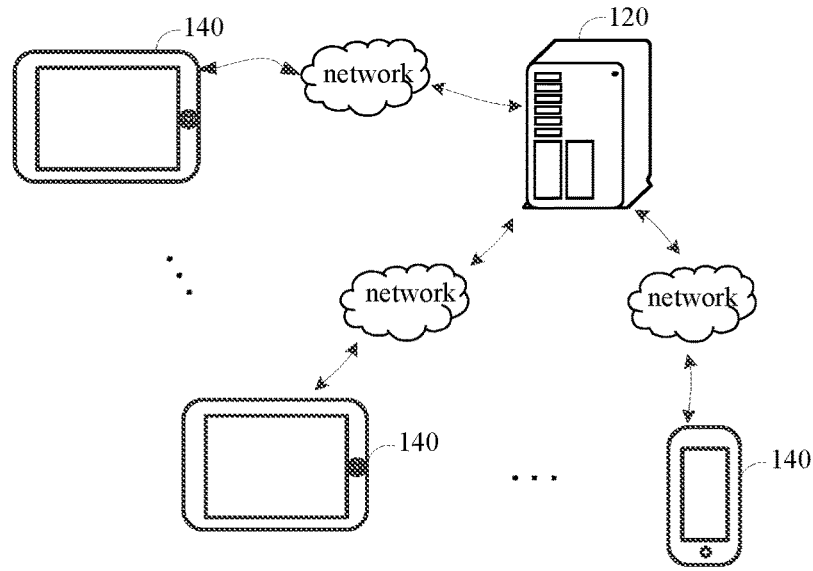
FIG. 1 is a schematic diagram illustrating an environment for implementing a network product display method according to various examples of the present invention.

FIG. 1 is a schematic diagram illustrating an environment for implementing a network product display method according to various examples of the present invention. The environment includes, but is not limited to, a server 120 and at least one terminal 140. The server 120 may be connected to the terminal 140 via a wired network mode or a wireless network mode.

The server 120 may be used to provide, store and manage network products. The server 120 may be at least one server or a cloud computing center. In other words, the server 120 may be implemented by a server or by a combination of multiple servers having the same or different functions. For example, the combination of multiple servers may include a server for managing the network products, a server for storing the network products, a server for calculating the lifetime of the network product and etc. In addition, the server 120 may be implemented by a cloud computing center which is virtual computing platform formed by server clusters.

The terminal 140 may be able to run a client terminal of any application program. The application program may be used to play a video or audio, or may be used to view pictures, or may have an album browsing function. The terminal 140 may run a browser, open a web page on the browser, and the opened web page may display information, e.g. a played video, pictures and etc. The terminal may be a smart phone, a personal computer, a tablet PC, a smart TV, a e-book reader, a Moving Picture Experts Group Audio Layer III (MP3) player, a Moving Picture Experts Group Audio Layer IV (MP4) player, a laptop computer or a desktop computer.

Figure 2:
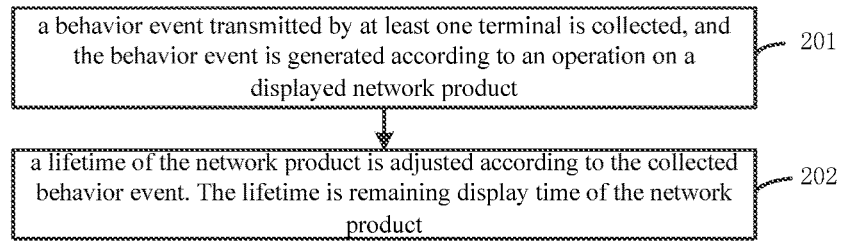
FIG. 2 is a schematic flowchart illustrating a network product display method according to an example of the present invention.

FIG. 2 is a schematic flowchart illustrating a network product display method according to an example of the present invention. In the example, the network product display method is applied to the server 120 in the environment shown in FIG. 1. The network product display method includes the following processing.

At 201, a behavior event transmitted by at least one terminal is collected, and the behavior event is generated according to an operation on a displayed network product.

The server may collect at least one behavior event which is performed for the displayed network product and transmitted by the at least one terminal. Namely, at least one terminal may generate the behavior event according to the operation performed by a user on the displayed network product, and the generated behavior event is transmitted to the server. The server may collect the behavior event transmitted by each terminal.

The network product may be audio, a video, a picture, an e-book or a download link of an installation package.

In practical applications, the behavior event may be configured according to a specific form of the network product. Generally, the behavior event may include browsing, forwarding, commenting, collecting, sharing and etc. The user may implement the above behavior events by perform operations on the network product displayed on the terminal.

At 202, a lifetime of the network product is adjusted according to the collected behavior event. The lifetime is remaining display time of the network product.

The lifetime is remaining display time of the network product, i.e. remaining time for displaying the network product. The server may reduce the lifetime as time goes on. For example, the server may reduce the lifetime by one second when one second has elapsed.

In some examples, the server may adjust the lifetime of the network product according to the collected behavior event besides reducing the lifetime as time goes on.

When releasing the network product, the server may configure an initial lifetime, e.g. a month, a week and etc. The initial lifetimes of different network products may be the same or different, which is not limited in the present disclosure.

Therefore, according to the network product display method provided by the present disclosure, the behavior event generated by the terminal according to the operation on the network product is collected, and the lifetime of the network product is adjusted according to the collected behavior events, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

It should be noted that, different implementation modes may be achieved via combining the example shown in FIG. 2 and the following one or more technical features.

In a first technical feature, the processing of adjusting the lifetime of the network product according to the collected behavior event includes at least one of: for each collected behavior event, increasing the lifetime of the network product if the behavior event is a preconfigured positive event which is a behavior event playing a positive role for increasing the lifetime; or for each collected behavior event, decreasing the lifetime of the network product if the behavior event is a preconfigured negative event which is a behavior event playing a negative role for increasing the lifetime.

In a second technical feature, the processing of adjusting the lifetime of the network product according to the collected behavior event includes: obtaining all behavior events collected during a collecting period at a preset time point which arrives when a preset time interval expires each time or when the number of the collected behavior events reaches a preset number threshold; calculating a total occurrence number of each type of the behavior events collected during the collecting period; and adjusting the lifetime of the network product according to a preset algorithm and the total occurrence number of each type of the behavior events.

In a third technical feature, before collecting the behavior event transmitted by the at least one terminal, the processing further includes: receiving an obtaining request from any terminal; the obtaining request being used to obtain the network product; and sending the network product and the lifetime of the network product to the terminal sending the obtaining request, so that the terminal may display the network product and the lifetime of the network product on a preconfigured location.

In a fourth technical feature, before collecting the behavior event transmitted by the at least one terminal, the processing further includes: obtaining a network product sending by a first terminal; determining a second terminal used by a friend user in a user relationship chain of the first terminal; sending the network product to the second terminal, so that the second terminal may display the network product and return a behavior event generated according to an operation on the network product; and receiving the behavior event returned by the second terminal.

In a fifth technical feature, after adjusting the lifetime of the network product according to the collected behavior event, the processing further includes: if the adjusted lifetime is larger than the preconfigured lifetime threshold, sending the adjusted lifetime to the terminal, so that the terminal may display the adjusted lifetime; and if the adjusted lifetime is smaller than or equal to the preconfigured lifetime threshold, cancelling the network product.

Figure 3:
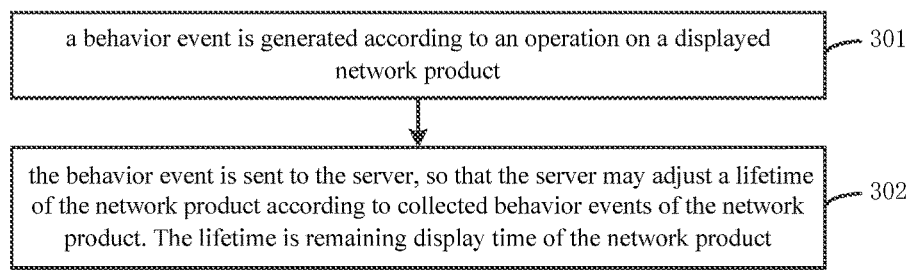
FIG. 3 is a schematic flowchart illustrating a network product display method according to another example of the present invention.

FIG. 3 is a schematic flowchart illustrating a network product display method according to another example of the present invention. In the example, the network product display method is applied to the terminal 140 in the environment shown in FIG. 1. The network product display method includes the following processing.

At 301, a behavior event is generated according to an operation on a displayed network product.

The terminal may receive the behavior event performed by a user for the displayed network product.

In practical applications, the terminal may display the network product. The network product may be audio, a video, a picture, an e-book or a download link of an installation package.

The user may view the network product displayed on the terminal and perform some operations on the network product. The behavior event may be configured according to a specific form of the network product. Generally, the behavior event may include browsing, forwarding, commenting, collecting, sharing and etc. The user may perform the operation on the network product displayed on the terminal, and the terminal may generate the above behavior event.

At 302, the behavior event is sent to the server, so that the server may adjust a lifetime of the network product according to collected behavior events of the network product. The lifetime is remaining display time of the network product.

The terminal may send the behavior event to the server, so that the server may adjust the lifetime of the network product according to the collected behavior events.

Therefore, according to the network product display method provided by the present disclosure, the behavior event is generated according to the operation on the network product and sent to the server, the server may adjust the lifetime of the network product according to the collected behavior events of the network product, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

It should be noted that, different implementation modes may be achieved via combining the example shown in FIG. 3 and the following one or more technical features.

In a first technical feature, before generating the behavior event according to the operation on the displayed network product, the processing further includes: sending an obtaining request to the server, the obtaining request being used to obtain the network product, so that the server may return the network product and the lifetime of the network product; receiving the network product and the lifetime of the network product; and displaying the network product and the lifetime of the network product on a preconfigured location.

In a second technical feature, after sending the behavior event to the server, the processing further includes: receiving the adjusted lifetime of the network product from the server, the adjusted lifetime being larger than a preconfigured lifetime threshold; and displaying the adjusted lifetime on the preconfigured location.

In a third technical feature, the processing further includes: generating a designated network product to be released; sending the designated network product to the server, so that the server may determine a second terminal used by a friend user in a user relationship chain of the first terminal, send the designated network product to the second terminal, receive a behavior event generated by the second terminal according to an operation on the designated network product, and adjust a lifetime of the designated network product; receiving the designated network product and the adjusted lifetime of the designated network product from the server; and displaying the designated network product and the adjusted lifetime of the designated network product on the preconfigured location.

FIG. 4 is a schematic flowchart illustrating a network product display method according to another example of the present invention. In the example, the network product display method is applied to the environment shown in FIG. 1. The network product display method includes the following processing.

At 401, a terminal sends an obtaining request for obtaining a network product to a server.

The network product may be audio, a video, a picture, an e-book or a download link of an installation package.

In practical applications, network products may be stored in the server by producers. Before viewing a certain network product, the terminal needs to obtain the network product from the related server, that is, the terminal needs to send the obtaining request for obtaining the network product to a server.

Generally, the terminal may obtain one or more network products from the server via sending the obtaining request once. For example, when a URL of a certain video website is input in a browser of the terminal and the obtaining request is sent to the server after a confirm operation, the server may send all network products (one or more network products) of the video website to the terminal, and the terminal may display the one or more network products. In this example, a user may input the URL of the certain video website in the browser of the terminal, and the terminal may obtain the URL of the certain video website input by the user and send the obtaining request including the URL of the video website to the server. The server may send all videos of the video website to the terminal according to the URL of the video website after receiving the obtaining request. The terminal may display the videos of the video website. For another example, when the terminal confirms to send the obtaining request for obtaining the network product to the server according to a certain link point in the browser, the server may send the network product to the terminal and the terminal may display the network product. In this example, multiple link points are displayed in the browser of the terminal and each link point corresponds to one or more network product. When the user selects a certain link point, the terminal may send the obtaining request including the link point to the server. The server may send the network product corresponding to the link point to the terminal after receiving the obtaining request. For another example, the terminal includes a client terminal for viewing videos (e.g. XX video player) configured in the terminal. The client terminal may send the obtaining request after the client terminal is started. The server may send all video information corresponding to the client terminal to the terminal, and the terminal may display all of the received video information.

At 402, the server receives the obtaining request for obtaining the network product from the terminal.

At 403, the server sends the network product and a lifetime of the network product to the terminal. The lifetime is remaining display time of the network product.

The server may configure the lifetime for the network product. When the network product needs to be released, the server may configure an initial lifetime according to practical requirements, e.g. a month, a week and etc.

The server may reduce the lifetime as time goes on, and the server may decrease or increase the lifetime of the network product according to the behavior event of the network product. Each network product corresponds to a current lifetime. When receiving the obtaining request for obtaining the network product from the terminal, the server may send the network product and the lifetime of the network product to the terminal.

At 404, the terminal receives and displays the network product and the lifetime of the network product sent by the server on a preconfigured location.

In order to drive the user to evaluate the network product, the terminal may display the lifetime of the network product besides displaying the network product at the preconfigured location after receiving the network product and the lifetime of the network product sent by the server. For example, FIG. 4B is a schematic diagram illustrating network products and lifetime of each network product which are displayed on a terminal according to an example of the present invention. The network products displayed on the terminal are videos and each video corresponds to a lifetime. The user may view the videos and the lifetime corresponding to each the videos on the terminal.

In some examples, the terminal may only display the network product in a default display mode after receiving the network product and the lifetime of the network product.

Figure 4A:
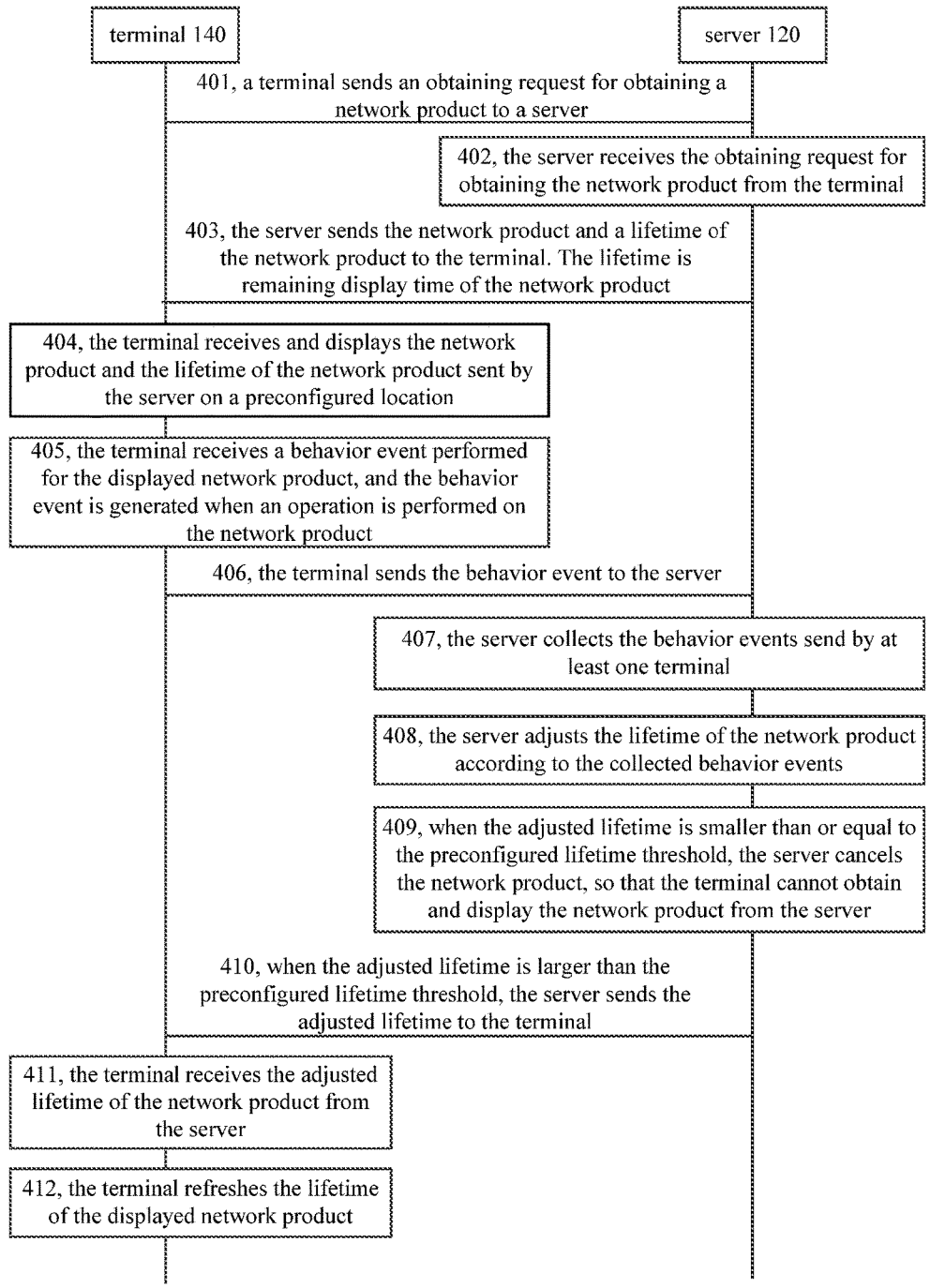
FIG. 4A is a schematic flowchart illustrating a network product display method according to another example of the present invention.
Figure 4B:
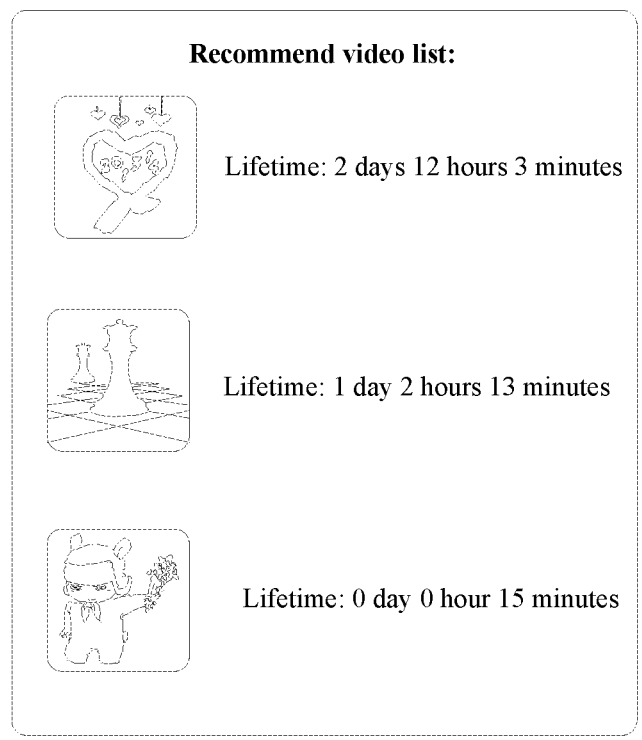
FIG. 4B is a schematic diagram illustrating network products and lifetime of each network product which are displayed on a terminal according to an example of the present invention.
Figure 4C:
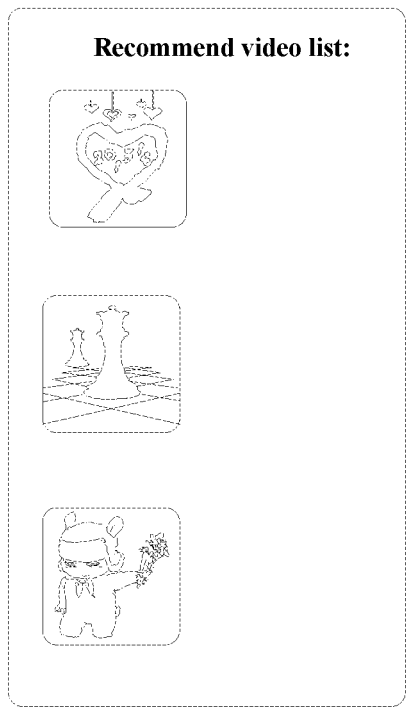
FIG. 4C is a schematic diagram illustrating network products displayed on a terminal according to an example of the present invention.
Figure 4D:
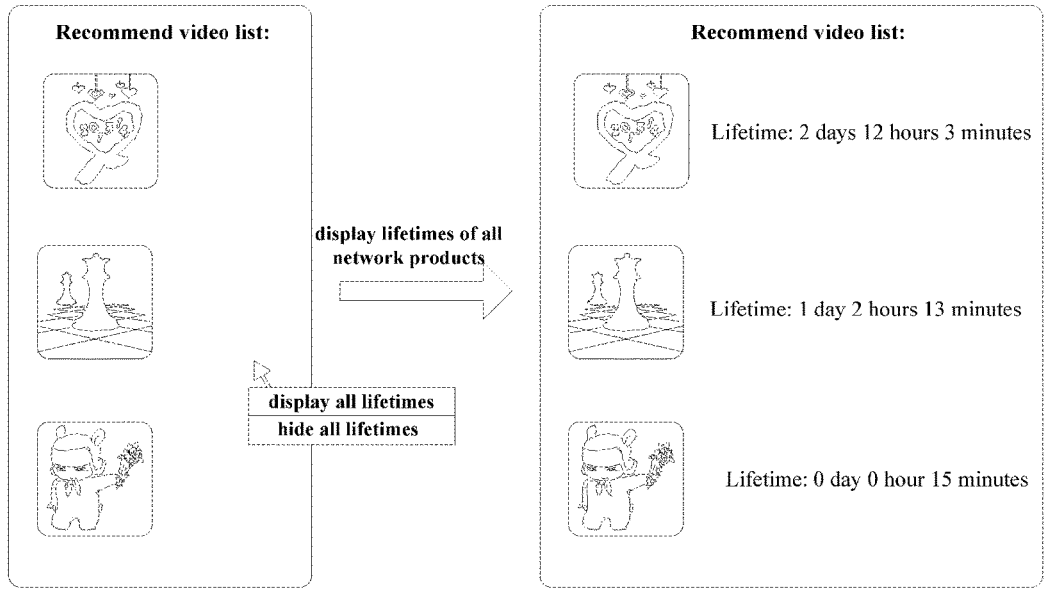
FIG. 4D is a schematic diagram illustrating display of lifetimes of all network products simultaneously implemented by using an operation according to an example of the present invention.
Figure 4E:
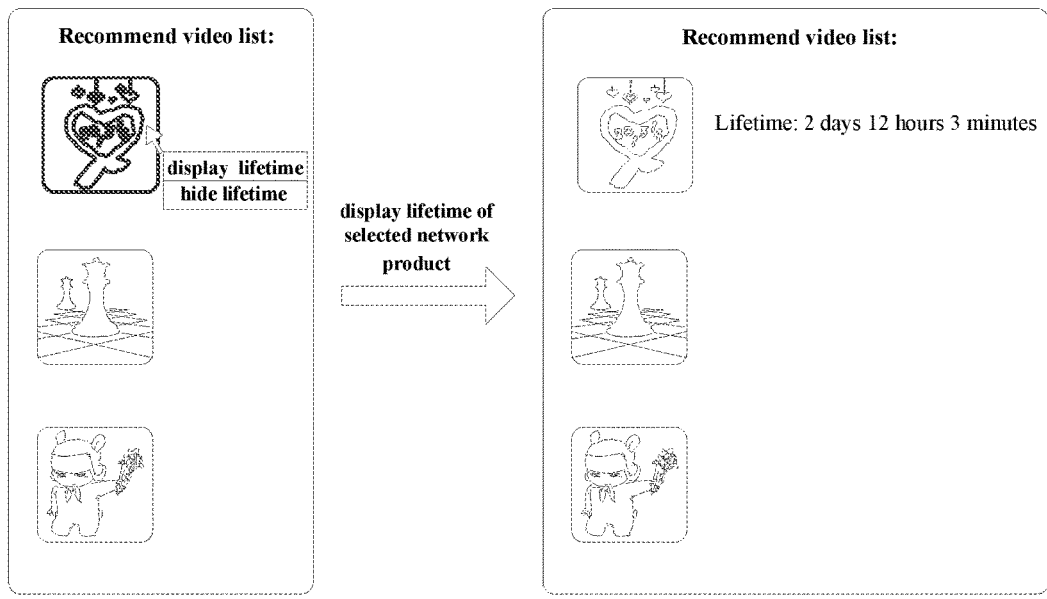
FIG. 4E is a schematic diagram illustrating display of a lifetime of one network product implemented by using an operation according to an example of the present invention.

FIG. 4C is a schematic diagram illustrating network products displayed on a terminal according to an example of the present invention. As shown in FIG. 4C, the network products (videos) are displayed without displaying the lifetime of the network product. In some examples, an option for displaying the lifetime of the network product may configured for the user, so that the user may select whether to display the lifetime of the network product. When the user selects the option for displaying the lifetime of the network product, the terminal may display the lifetime of the network product according to the lifetime of the network product sent by the server. In some examples, the terminal may configure an option for displaying the lifetimes of all network products. FIG. 4D is a schematic diagram illustrating display of lifetimes of all network products simultaneously implemented by using an operation according to an example of the present invention. When the user right-clicks (or clicks on the screen for several times in a short period of time) on a blank area of a network product page displayed on the terminal, a selection box is popped up, and the user may select the option for displaying the lifetimes of all network products. The terminal may directly display the received lifetimes of the network products after receiving a displaying request generated when the user selects the option. In practical applications, the option for displaying the lifetimes of all network products may be configured on the web page for displaying the network products, and the user may directly select the option, so that the terminal may display the received lifetimes of the network products after receiving the displaying request generated when the user selects the option. In some examples, the terminal may configure an option for displaying the lifetime of a single network product. FIG. 4E is a schematic diagram illustrating display of a lifetime of one network product implemented by using an operation according to an example of the present invention. The user may select one network product and perform a right-clicking operation (or click on the screen several times in a short period of time, or slide on the screen within a designated area adjacent to the network product, or long-press an area for displaying the network product), the terminal may pop up a selection box, the user may select the option for displaying the lifetime of the network product. The terminal may directly display the received lifetime of the network product after receiving a displaying request generated when the user selects the option. In practical applications, the option for displaying the lifetime of the network product may be configured on the area adjacent to each of the displayed network products. The user may directly select the option corresponding to a certain network product, so that the terminal may display the received lifetime of the network product after receiving a displaying request generated when the user selects the option corresponding to the network product.

In practical applications, the server may send the network product to the terminal without sending the lifetime of the network product. The terminal may display the network product only in a default mode. When the user selects to display the lifetime of the network product via an operation, the terminal may receive an operation of the user selecting to display the lifetime, and then send a time displaying request for displaying the lifetime of the network product to the server. The server may send the lifetime of the network product to the terminal. The terminal may receive the lifetime of the network product sent by the server and display the lifetime of the network product on a preconfigured location which is generally adjacent to the network product. That is, when the user selects to display the lifetime of the network product via clicking a configured option, the terminal may detect the operation of the user clicking the option and send a lifetime displaying request for displaying the lifetime of the network product to the server. After receiving the lifetime displaying request, the server may send the lifetime of the network product to the terminal. The terminal may receive the lifetime from the server and display the lifetime of the network product on the preconfigured location.

At 405, the terminal receives a behavior event performed for the displayed network product, and the behavior event is generated when an operation is performed on the network product.

In practical applications, the terminal may display other related information when displaying the network product, e.g. may display options via which the user may perform some operations. The behavior event may be configured according to a specific form of the network product. Generally, the behavior events may include browsing, forwarding, commenting, collecting, sharing and etc. The user may implement the above behavior events by performing operations via the options of the network product displayed on the terminal. Generally, the behavior events are used to represent whether the user likes the network product. For example, if the user clicks to view a network product, it usually means that the user has a certain interest in the network product. For another example, if the user forwards a network product, it usually means that the user likes the network product and thinks that the network product is worthy to recommend. For another example, if the user makes a negative evaluation to a network product (e.g. selecting "down" or "not like"), it usually means that the user does not like the network product.

In a possible implementation mode, for the purpose of indicating user-like opinions and user-not-like opinions, when the network product is released, the behavior events configured for the network product generally include at least two types. At least one type of behavior events is used to indicate the user-like opinions and this type of behavior events is determined as positive events, and at least one type of behavior events is used to indicate the user-not-like opinions and this type of behavior events is determined as negative events. In other words, at least one type of behavior events is used to indicate a high-degree of favor of the user and at least one type of behavior events is used to indicate a low-degree of favor of the user.

Figure 4F:
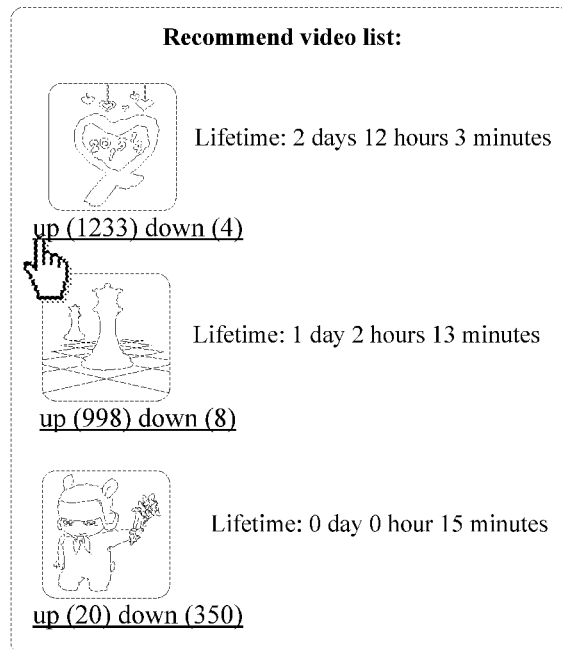
FIG. 4F is a schematic diagram illustrating options provided for a user according to an example of the present invention.
Figure 4G:
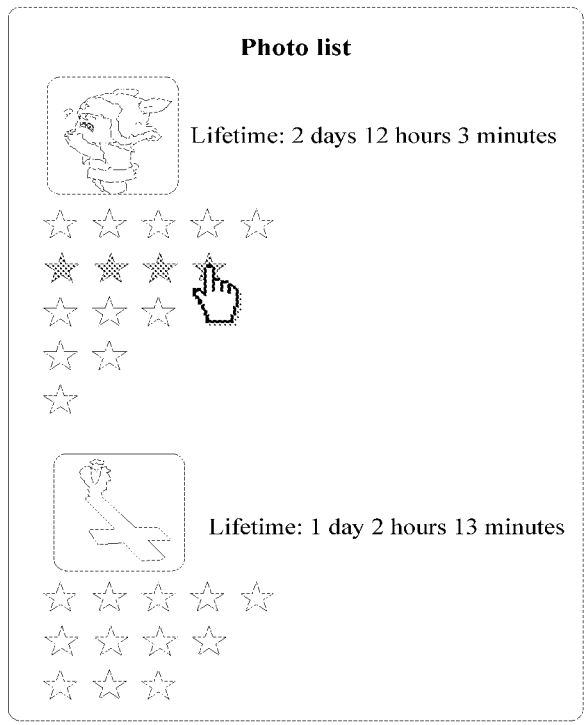
FIG. 4G is a schematic diagram illustrating options provided for a user according to another example of the present invention.

In an example, FIG. 4F is a schematic diagram illustrating options provided for a user according to an example of the present invention. In FIG. 4F, the options related to the network product are displayed adjacent to each displayed network product (the video program as shown in FIG. 4F), and the user may select the options to generate the behavior events. For example, the option may be "up" or "down" shown in FIG. 4F. The user may select the option of the network product according to personal preferences for the network product. Accordingly, the behavior events generated when the user selects the options include two types: clicking "up" which may be regarded as the positive event and clicking "down" which may be regarded as the negative event. In another example, FIG. 4G is a schematic diagram illustrating options provided for a user according to another example of the present invention. In FIG. 4G, the options (five stars as shown in FIG. 4G) corresponding to the network product is displayed adjacent to each displayed network products (photos as shown in FIG. 4G). The user may select one star, two stars or three stars and etc. to comment the network product according to personal preferences for the network product. The behavior events generated when the user selects the options include five types: selecting five stars, selecting four stars, selecting three stars, selecting two stars and selecting one star. Herein, selecting five stars, selecting four stars and selecting three stars may be regarded as the positive events, and selecting two stars and selecting one star may be regarded as the negative events.

Figure 4H:
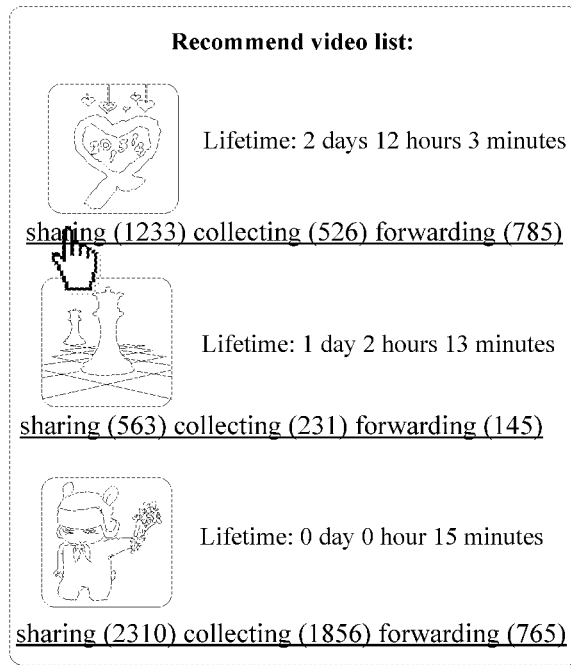
FIG. 4H is a schematic diagram illustrating options provided for a user according to another example of the present invention.

In a possible implementation mode, when the network product is released, the user-like opinions may be represented only. For example, at least one behavior event of sharing, browsing, or forwarding may be included. For example, the behavior events to be selected by the user include selecting "sharing", selecting "forwarding", selecting "collecting" and etc. The behavior events are actions performed when the user likes the network product. As shown in FIG. 4H which is a schematic diagram illustrating options provided for a user according to another example of the present invention, the options provided for the user include "sharing", "forwarding", and "collecting".

Figure 4I:
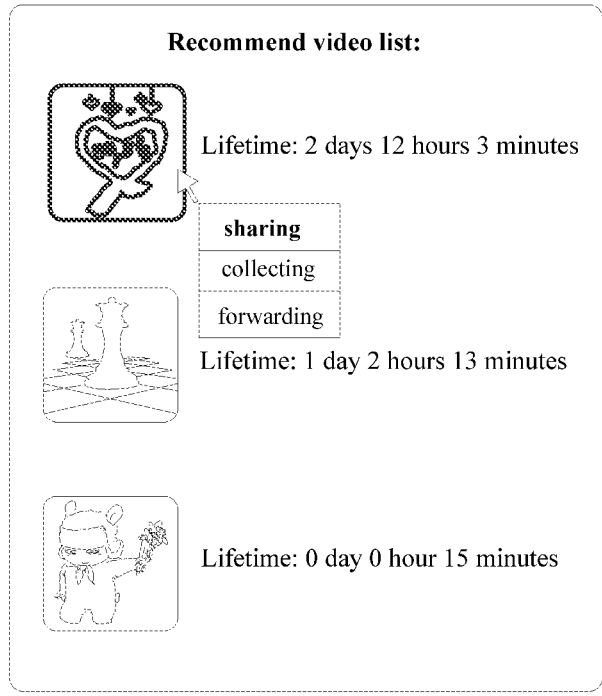
FIG. 4I is a schematic diagram illustrating a user performing an operation corresponding to a behavior event on a network product having displayed options according to another example of the present invention.

In some examples, the options may be not displayed on the terminal when the network product is displayed. When the user needs to perform a certain behavior event for the network product, some designated modes may be used to make the terminal display the options related to the network product, so that the user may perform the certain behavior event according to the options. For example, FIG. 4I is a schematic diagram illustrating a user performing an operation corresponding to a behavior event on a network product having displayed options according to another example of the present invention. The user may send a displaying instruction for displaying the options related to the network product to the terminal via a certain mode, e.g. right-clicks a mouse on the display network product. The terminal may display the options of the network product after receiving the displaying instruction.

Therefore, when the terminal displays the network product, the user may perform the operation on the network product. The terminal may detect the operation of the user and generate the behavior event corresponding to the operation. For example, when the user triggers a forwarding operation for the network product, the terminal may generate a forwarding behavior event.

The behavior events may indicate the user-like opinions of the network product and the user-not-like opinions of the network product. In order to distinguish the two types of opinions, one type of behavior events is used to indicate the user-like opinion of the network product and this type of behavior events is determined as positive events, and the other type of behavior events is used to indicate the user-not-like opinion of the network product and this type of behavior events is determined as negative events.

The behavior events may further used to indicate favor-degrees of the user for the network product. When the favor-degree of the user for the network product indicated by the behavior event is relatively high, the behavior event is determined as the positive event. When the favor-degree of the user for the network product indicated by the behavior event is relatively low, the behavior event is determined as the negative event. For example, if the user clicks to view a network product, it means that the user has a certain interest in the network product, and the favor-degree for the network product is high. If the user forwards a network product, it means that the user likes the network product and thinks that the network product is worthy to recommend, the favor-degree for the network product is higher than the favor-degree indicated when the user views the network product.

According to the favor-degrees for the network product indicated by each behavior event, the terminal may configure an interest level for each behavior event and determine a preconfigured interest level. The behavior event having the interest level higher than the preconfigured interest level is determined as the positive event, and the behavior event having the interest level lower than or equal to the preconfigured interest level is determined as the negative event.

At 406, the terminal sends the behavior event to the server.

After the behavior event is generated when the user performs the operation on a certain network product via the terminal, the terminal may directly send the behavior event to the server in real time.

At 407, the server collects the behavior events send by at least one terminal.

In practical applications, after the network product is released, a large number of terminals may download and display the network product, and thus a lot of behavior events corresponding to the network product are generated at many different terminals. Each terminal generating the behavior event corresponding to the network product may send the behavior event performed for the displayed network product to the server. The server may collect the behavior events performed for the displayed network product from the at least one terminal.

For example, if the behavior events corresponding to a certain network product include an event 1, an event 2 and an event 3, the server may receive from the terminal at least one of the event 1, event 2 or event 3. For example, the server may receive 300 events 1, 350 events 2, 600 events 3 and etc. The number here is only an example.

At 408, the server adjusts the lifetime of the network product according to the collected behavior events.

In a first case, the server may adjust the lifetime of the network product according to the received behavior event every time when the behavior event is received. The processing of the server adjusting the lifetime of the network product according to the collected behavior events may be as follows.

Firstly, if the behavior event is a preconfigured positive event, the lifetime of the network product is increased. The positive event is a behavior event playing a positive role for increasing the lifetime.

In practical applications, the server may preconfigure the behavior events belonging to the positive events and store the positive events into a positive event table, and preconfigure the behavior events belonging to the negative events and store the negative events into a positive event table. Each time when the server receives one behavior event, the server may determine whether the positive event table includes the behavior event. When the positive event table includes the behavior event, the behavior event is determined as the preconfigured positive event. Or, the server may preset a preconfigured interest level. When receiving the behavior event, the server may obtain an interest level of the behavior event. If the interest level of the behavior event is higher than the preconfigured interest level, the behavior event is determined as the preconfigured positive event.

The server may configure an increasing proportion for the positive event and adjust the lifetime of the network product according to the increasing proportion. Further, the server may configure different increasing proportions for different positive events. For example, the increasing proportion configured for the behavior event of "browsing" may be 3% and the increasing proportion configured for the behavior event of "sharing" may be 5%. Each time when receiving the positive event, the server may increase the current lifetime according to the increasing proportion corresponding to the positive event. For example, a certain behavior event of the network product is the preconfigured positive event and the increasing proportion is 5%, if the current lifetime is 30 minutes, the adjusted lifetime is 31 minutes and 30 seconds.

Secondly, if the behavior event is a preconfigured negative event, the lifetime of the network product is decreased. The negative event is a behavior event playing a negative role for increasing the lifetime.

Each time when the server receives one behavior event, the server may determine whether the negative event table includes the behavior event. When the negative event table includes the behavior event, the behavior event is determined as the preconfigured negative event. Or, when receiving the behavior event, the server may obtain an interest level of the behavior event. If the interest level of the behavior event is lower than or equal to the preconfigured interest level, the behavior event is determined as the preconfigured negative event.

In practical applications, the server may configure a decreasing proportion for the negative event and adjust the lifetime of the network product according to the decreasing proportion. Further, the server may configure different decreasing proportions for different negative events. For example, the negative event is clicking "down", and the decreasing proportion configured for the behavior event of "down" may be −2%. Each time when receiving the negative event, the server may decrease the current lifetime according to the decreasing proportion corresponding to the negative event. For example, a certain behavior event of the network product is the preconfigured negative event and the decreasing proportion is −2%, if the current lifetime is 30 minutes, the adjusted lifetime is 29 minutes and 50 seconds.

In some examples, an adjusting proportion corresponding to a behavior event of the network product may be preconfigured. If the behavior event is the preconfigured positive event, an increasing proportion is configured, if the behavior event is the preconfigured negative event, a decreasing proportion is configured, and the lifetime of the network product is adjusted according to the adjusting proportion corresponding to the collected behavior events of the network product.

In a second case, the server may obtain statistics of behavior events of the network product collected during a certain time period, and adjust the lifetime of the network product according to the statistics. The processing of the server adjusting the lifetime of the network product according to the collected behavior events may be as follows.

Firstly, all behavior events collected during a collecting period is obtained at a preset time point. The preset time point arrives when a preset time interval expires each time or when the number of the collected behavior events reaches a preset number threshold.

In practical applications, in order to reduce computation load of the server, the lifetime of the network product may be adjusted according to all of the collected behavior events after the behavior events are collected for a certain time period or after the number of the collected behavior events reaches a preset number threshold. For example, all of the behavior events of the network product collected in one day may be obtained every day, or the number of the behavior events of the network product is calculated every time when a behavior event of the network product is collected, and all of the collected behavior events of the network product may be obtained after the calculated number reaches the preset number threshold.

If the preset time point arrives when the preset time interval expires each time, the collecting period ends at the preset time point, and the length of the collecting period is equal to the preset time interval. If the preset time point arrives when the number of the collected behavior events reaches the preset number threshold, the collecting period starts at a last preset time point and ends at a current preset time point.

Secondly, the total occurrence number of each type of the behavior events collected during the collecting period is calculated.

Generally, the network product may correspond to various types of behavior events, e.g. "browsing", "sharing", "collecting", and etc. Different users may perform different behavior events for the same network product. Thus, it is necessary to calculate the total occurrence number of each type of the behavior events collected during the collecting period. For example, for the same network product, the total occurrence number of "browsing" collected during the collecting period may be 3500, the total occurrence number of "sharing" collected during the collecting period may be 1806, and the total occurrence number of "collecting" collected during the collecting period may be 2641.

Thirdly, the lifetime of the network product is adjusted according to a preset algorithm and the calculated total occurrence number of each type of the behavior events.

In practical applications, a weight may be preconfigured for each type of the behavior event of the network product, and the lifetime of the network product may be adjusted according to a time length to be adjusted for each type of the behavior event and the weight of each type of the behavior event. The time length to be adjusted for each type of the behavior event is determined according to a time length to be adjusted for a single behavior event and the total occurrence number of the behavior event. If the time length to be adjusted for the single behavior event is the same for each type of the behavior event, the time length to be adjusted for each type of the behavior event is a product of the time length to be adjusted for the single behavior event and the total occurrence number of the behavior event.

The server may configure the weight according to the type of the behavior event, i.e. the weight is configured for each type of the behavior event respectively. For each type of the behavior event, the server may obtain the weight configured for the type of the behavior event, calculate a product of the time length to be adjusted for the single behavior event, the total occurrence number of each type of the behavior events and the obtained weight, and adjust the lifetime of the network product according to the calculated product.

For example, the weight of the sharing event is 0.9, each sharing event may increase the lifetime by 1 second, the total occurrence number of the sharing events is 100, thus the adjusted lifetime is 0.9*100*1=90 second, i.e. 90 seconds are added to the lifetime.

In addition, besides the type of the behavior event, factors affecting the lifetime of the network product also include a user level of the user triggering the behavior event, the occurrence time of the behavior event and etc. For each behavior event of each type, the server may consider multiple factors to determine the time length to be adjusted for the behavior event. Because different behavior events of the same type may have different user levels and occurrence times, the time lengths to be adjusted for the behavior events determined by the server may be different. The server may calculate a sum of the time length to be adjusted for each behavior event of this type, and the sum is taken as the time length to be adjusted for the behavior event of this type, and then the server may calculate a product of the time length to be adjusted for the behavior event of this type and the weight, and adjust the lifetime of the network product according to the product.

For example, the weight of the sharing event is 0.9, and the server collects two sharing events which are a sharing event A and a sharing event B. The user level of a user triggering the sharing event A is a top level which is level 1, and the user level of a user triggering the sharing event B is level 2. After considering the user levels corresponding to the sharing event, the time length to be adjusted for the sharing event A is configured as 2 second, the time length to be adjusted for the sharing event B is configured as 1 second, and the lifetime is adjusted as 0.9*(2+1)=2.7 second, i.e. 2.7 seconds is added to the lifetime.

Considering that multiple types of the behavior events may be divided into the positive events and the negative events, the server may configure a weight for the positive event and configure a weight for the negative event. The server may configure a time length to be adjusted for the positive event, and configure a time length to be adjusted for the negative event. The time length to be adjusted for the positive event is a positive number which indicates increasing the lifetime, and the time length to be adjusted for the negative event is a negative number which indicates decreasing the lifetime. For each type of behavior event, the server may determine whether this type of behavior event is the positive event or the negative event, so as to obtain the time length to be adjusted and the weight corresponding to this type of behavior event. The server may obtain the total occurrence number of this type of behavior event, calculate a product of the total occurrence number, the obtained time length to be adjusted and the weight, and adjust the lifetime of the network product according to the product. In some examples, the weight configured for the positive events is higher than the weight configured for the negative events, and the time length to be adjusted for the positive events is equal to the time length to be adjusted for the negative events.

For example, when the behavior event is the positive event, the lifetime is increased, and when the behavior event is the negative event, the lifetime is decreased. For example, a certain network product corresponds to a positive event and a negative event. The positive event is collected by the server for 300 times, and the negative event is collected by the server for 100 times. Each positive event may increase the lifetime by 1 second (i.e. the time length to be adjusted is +1 second), and each negative event may decrease the lifetime by 1 second (i.e. the time length to be adjusted is −1 second). The weight of the positive event is 0.7 and the weight of the negative event is 0.5. Hence, the lifetime is adjusted as 0.7*300*1−0.3*100*1=180 seconds, i.e. if the lifetime is 20 minutes before the adjustment is performed, the adjusted lifetime is 23 minutes.

In some examples, other preconfigured algorithms may be used to adjust the lifetime of the network product. For example, the lifetime of the network product may be adjusted according to the occurrence frequency of the behavior event. In a possible implementing mode, the occurrence frequencies of the behavior events are divided into different levels corresponding to different adjusting ratios, and the lifetime of the network product may be adjusted according to the adjusting ratio corresponding to the occurrence frequency of the behavior event. For example, the occurrence frequency of sharing may be calculated according to the total occurrence number of sharing the network product and the total occurrence number of viewing the network product (e.g. dividing the total occurrence number of viewing the network product by the total occurrence number of sharing the network product), and the lifetime of the network product may be adjusted according to the occurrence frequency of sharing. In some examples, the occurrence frequencies of sharing are divided into different levels corresponding to different adjusting ratios, and the lifetime of the network product may be adjusted according to the adjusting ratio corresponding to the occurrence frequency of sharing. For an example, the occurrence frequencies of sharing are divided into three levels, 0~30%, 30%~60%, 60%~100%, the corresponding adjusting ratios are 10%, 30% and 50% respectively. If an occurrence frequency of sharing is 40% and a current lifetime is 20 minutes, the adjusted lifetime is 20 minutes+40%*30%*20 minutes=22 minutes and 24 seconds.

In a third case, the server may determine an identity hierarchy of the user sending the behavior event, determine an adjusting weight corresponding to the behavior event according to a relationship between the identity hierarchies and the adjusting weights, and adjust the lifetime of the network product according to the determined adjusting weight, which may refers to the descriptions for the first case and the second case and will not described herein.

For example, if a sharing event collected by the server for an item of a microblog is generated by a user having a "V" (e.g. authenticated users will have a V logo), the adjusting weight is 5. If a sharing event collected by the server for an item of a microblog is generated by a user without a "V", the adjusting weight is 2.

The server may adjust the lifetime of the network product by combining any two or three of the above-mentioned three cases. For example, when the first and third cases are combined, the processing of adjusting the lifetime of the network product is as follows. When receiving each behavior event, the server may obtain the adjusting ratio of the behavior event, i.e. obtain the increasing ratio corresponding to the behavior event if the behavior event is the preconfigured positive event or obtain the decreasing ratio corresponding to the behavior event if the behavior event is the preconfigured negative event. Then, the server may obtain the user level of the user triggering the behavior event, obtain the weight corresponding to the user level, calculate a product of the adjusting ratio of the behavior event and the weight corresponding to the user level, and adjust the lifetime of the network product according to the product.

At 409, when the adjusted lifetime is smaller than or equal to the preconfigured lifetime threshold, the server cancels the network product, so that the terminal cannot obtain and display the network product from the server.

The preconfigured lifetime threshold may be configured according to practical requirements, e.g. configured as 0. The server may preset the preconfigured lifetime threshold, or may modify the preconfigured lifetime threshold according to a current resource occupancy rate and the number of the network products stored currently in the operation of the server, which is not limited in the present invention.

When the adjusted lifetime of the network product is smaller than or equal to the preconfigured lifetime threshold, the server may cancel the network product. In a possible implementing mode, the server may store the cancelled network product to a backup server or other backup storage area.

Generally, the terminal cannot view the network product after the server cancels the network product. In practical applications, the following cases may be included.

In a first case, the network product is cancelled by the server and the terminal wants to request to display the network product. Because the terminal needs to request to obtain the network product before displaying the network product, the terminal cannot display the network product as the network product is cancelled by the server.

In a second case, before the server cancels the network product, the network product is downloaded and displayed by some terminals. After the server cancels the network product, the terminals may still display the network product. After the terminal closes the network product, if the terminal wants to display the network product again, because the terminal needs to request to obtain the network product before displaying the network product, the terminal cannot display the network product again as the network product is cancelled by the server.

In should be noted that, if the original lifetime of the network product is too short, after one or litter users perform the behavior event and the server adjusts the lifetime of the network product accordingly, the adjusted lifetime may be less than the preconfigured lifetime threshold, and the network product is directly cancelled. Hence, the original lifetime of the network product may be configured longer, so that many users may view and comment on the network product.

The server may adjust the lifetime of the network product according to the operation performed by the user on the network product. Once the lifetime of the network product is less than or equal to the preconfigured lifetime threshold, the server may cancel the network product and release resources occupied by the network product.

At 410, when the adjusted lifetime is larger than the preconfigured lifetime threshold, the server sends the adjusted lifetime to the terminal.

When the adjusted lifetime is larger than the preconfigured lifetime threshold, the server may refresh the lifetime of the network product stored in the server, so that the terminal may display the last adjusted lifetime after requesting to display the network product.

In a possible implementing mode, the server may notify the terminal of the adjusted lifetime of the network product, so that the terminal may display the adjusted lifetime to the user as soon as possible.

At 411, the terminal receives the adjusted lifetime of the network product from the server.

At 412, the terminal refreshes the lifetime of the displayed network product.

After receiving the adjusted lifetime of the network product from the server, the terminal may refresh the lifetime of the displayed network product.

For example, the lifetime of the network product originally displayed on the terminal is 1 hour 30 minutes and 48 seconds, and the lifetime adjusted by the server for the network product is 1 hour 32 minutes and 52 seconds. The server sends the adjusted lifetime to the terminal, and the terminal refreshes the lifetime of the displayed network product and displays 1 hour 32 minutes and 52 seconds, so that the user may see the current lifetime of the network product.

Therefore, according to the network product display method provided by the present disclosure, the behavior events generated according to the operations performed by the user on the displayed network product are collected and sent to the server, the server may adjust the lifetime of the network product according to the collected behavior events, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

It should be noted that, steps 401, 404-406, 411 and 412 may be implemented as the network product display method performed by the terminal 140, and steps 4021, 403, 407-410 may be implemented as the network product display method performed by the server 120.

Figure 5A:
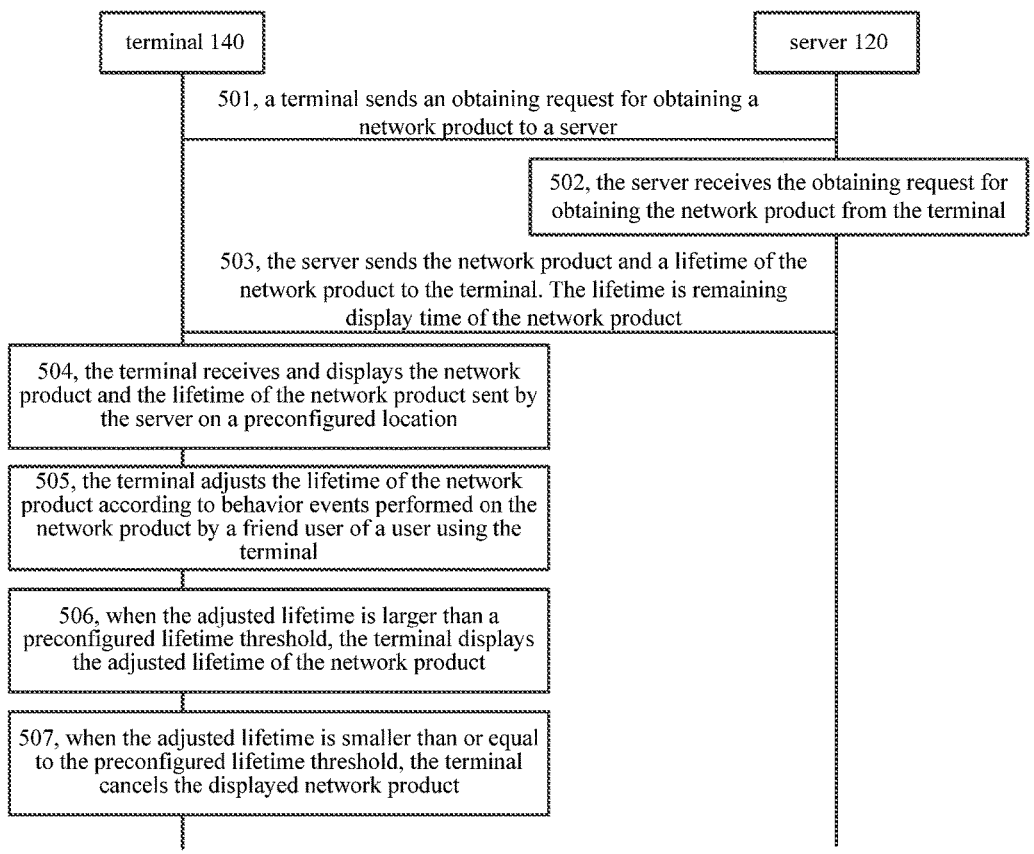
FIG. 5A is a schematic flowchart illustrating a network product display method according to another example of the present invention.

FIG. 5A is a schematic flowchart illustrating a network product display method according to another example of the present invention. In the example, the network product display method is applied to the environment shown in FIG. 1. The network product display method includes the following processing.

At 501, a terminal sends an obtaining request for obtaining a network product to a server.

The network product may be audio, a video, a picture, an e-book or a download link of an installation package.

In practical applications, network products may be stored in the server by producers. Before viewing a certain network product, the terminal needs to obtain the network product from the related server, that is, the terminal needs to send the obtaining request for obtaining the network product to a server.

At 502, the server receives the obtaining request for obtaining the network product from the terminal.

At 503, the server sends the network product and a lifetime of the network product to the terminal. The lifetime is remaining display time of the network product.

The server may configure the lifetime for the network product. When the network product needs to be released, the server may configure an initial lifetime according to practical requirements, e.g. a month, a week and etc.

Each network product corresponds to a current lifetime. When receiving the obtaining request for obtaining the network product from the terminal, the server may send the network product and the current lifetime of the network product to the terminal.

At 504, the terminal receives and displays the network product and the lifetime of the network product sent by the server on a preconfigured location.

At 505, the terminal adjusts the lifetime of the network product according to behavior events performed on the network product by a friend user of a user using the terminal.

The friend user of the user using the terminal is a friend of the user who logs in via the terminal. For example, the user logging in via the terminal is ss, the friend users of ss is sa, tb, and yd. The terminal via which ss logs in may adjust the lifetime of the network product according to behavior events performed on the network product by the friend users sa, tb, and yd. That is, the terminal may adjust the lifetime of the network product according to behavior events performed by a friend circle on the network product.

The processing of the terminal adjusting the lifetime of the network product according to behavior events performed on the network product by the friend user of the user using the terminal includes the following two cases.

In the first case, the terminal may adjust the lifetime of the network product according to collected behavior events performed on the network product by the friend users in real time, which includes: increasing the lifetime of the network product if the behavior event is a preconfigured positive event which is a behavior event playing a positive role for increasing the lifetime; and/or decreasing the lifetime of the network product if the behavior event is a preconfigured negative event which is a behavior event playing a negative role for increasing the lifetime.

In a second case, at a fixed interval of time, the terminal may adjust the lifetime of the network product according to the behavior events which are performed on the network product by the friend users and are collected during the fixed interval of time, which includes: obtaining all behavior events collected during a collecting period at a preset time point which arrives when a preset time interval expires each time or when the number of the collected behavior events reaches a preset number threshold; calculating a total occurrence number of each type of the behavior events collected during the collecting period; and adjusting the lifetime of the network product according to a preset algorithm and the calculated total occurrence number of each type of the behavior events.

The processing of the terminal adjusting the lifetime of the network product according to behavior events performed on the network product is similar with the processing performed by the server and will not described herein.

At 506, when the adjusted lifetime is larger than a preconfigured lifetime threshold, the terminal displays the adjusted lifetime of the network product.

For example, after the terminal adjusts the lifetime of the network product according to the behavior events performed on the network product by the friend circle, if the adjusted lifetime is larger than 0 (the preconfigured threshold), the terminal may display the adjusted lifetime of the network product.

Figure 5B:
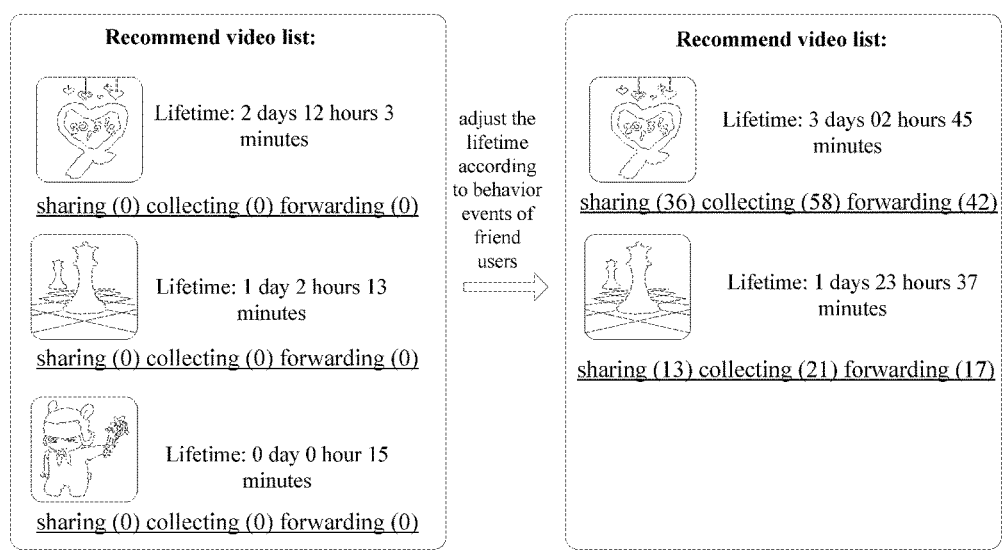
FIG. 5B is a schematic flowchart illustrating adjustment of lifetime of a network product displayed on a terminal according to a behavior event of a friend user according to various example of the present invention.

FIG. 5B is a schematic flowchart illustrating adjustment of a lifetime of a network product displayed on a terminal according to a behavior event of a friend user according to various example of the present invention. For a first video shown in FIG. 5B, according to the behavior events performed by the friend users on the first video (36 times of sharing, 58 times of collecting and 42 times of forwarding), an original lifetime "2 days 12 hours 3 minutes" is adjusted as "3 days 02 hours 45 minutes". For a second video shown in FIG. 5B, according to the behavior events performed by the friend users on the second video (13 times of sharing, 21 times of collecting and 17 times of forwarding), an original lifetime "1 day 2 hours 13 minutes" is adjusted as "1 day 23 hours 37 minutes".

At 507, when the adjusted lifetime is smaller than or equal to the preconfigured lifetime threshold, the terminal cancels the displayed network product.

For example, after the terminal adjusts the lifetime of the network product according to behavior events performed on the network product by the friend circle, if the adjusted lifetime is less than 0 (the preconfigured lifetime threshold), the terminal may directly cancel the displayed network product.

As shown in FIG. 5B, for a third video shown in FIG. 5B, according to the behavior events performed by the friend users on the third video (0 sharing, 0 collecting and 3 times of forwarding), the adjusted lifetime may be less than 0 because the lifetime keeps on decreasing and the time length to be added to the lifetime is small than the decreased time length during the collecting period, and the terminal may directly cancel the display third video.

Therefore, according to the network product display method provided by the present disclosure, the behavior events generated when the friend users perform the operations on the network product are collected and the lifetime of the network product is adjusted accordingly, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

It should be noted that, steps 501, 504-507 may be implemented as the network product display method performed by the terminal 140, and steps 502 and 503 may be implemented as the network product display method performed by the server 120.

Figure 6:
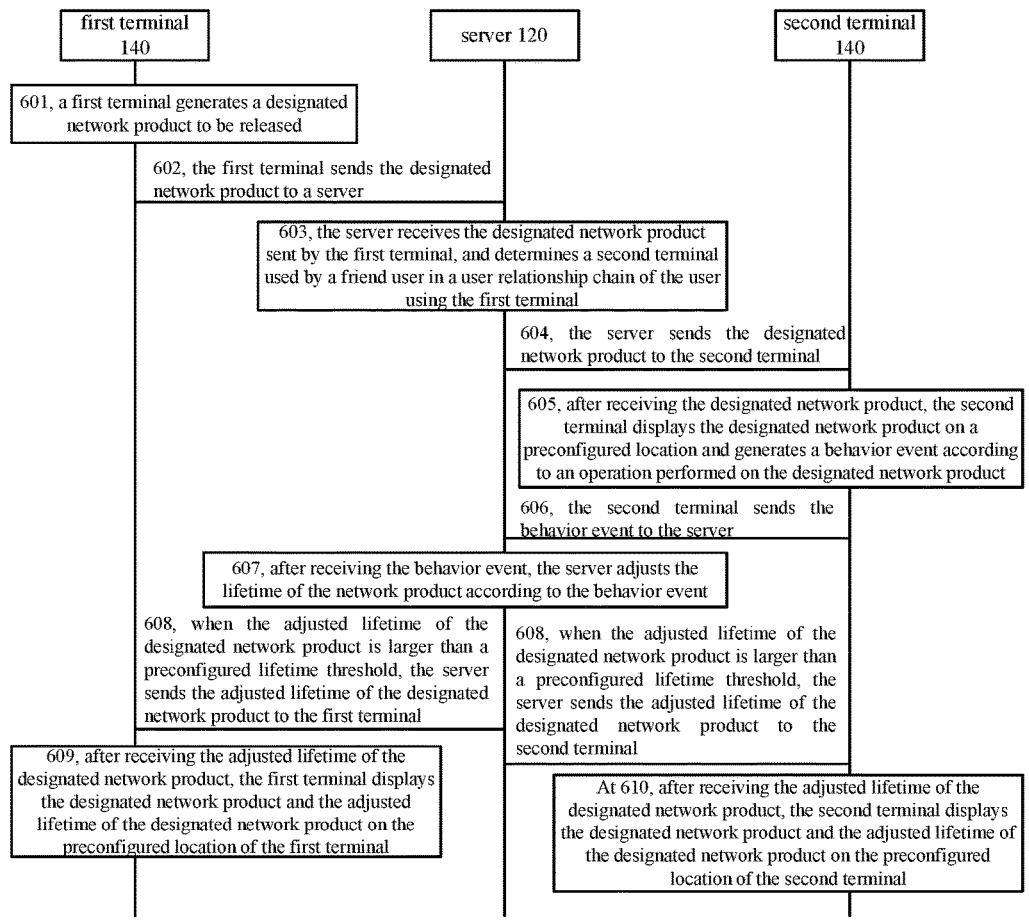
FIG. 6 is a schematic flowchart illustrating a network product display method according to another example of the present invention.

FIG. 6 is a schematic flowchart illustrating a network product display method according to another example of the present invention. In the example, the network product display method is applied to the environment shown in FIG. 1. The network product display method includes the following processing.

At 601, a first terminal generates a designated network product to be released.

The designated network product is generated by the first terminal, and may be a video recorded by a user via the first terminal, text information input by the user, or a photo taken by the first terminal, which is not limited in the present disclosure.

At 602, the first terminal sends the designated network product to a server.

The server may be a server of a social platform, e.g. a server of a micro-blog platform or a server of a WeChat platform which is not limited in the present disclosure. Application programs of the social platform are able to be installed on the first terminal and a second terminal which communicate with the server via the application programs of the social platform.

When the user wants to upload the generated designated network product to the server to share the designated network product with other users, the user may trigger an operation of uploading the designated network product on the first terminal. When detecting the operation of uploading the designated network product, the first terminal may send the designated network product to the server. The first terminal may provide an option for uploading the designated network product, and the operation of uploading the designated network product may be triggered by the user via clicking the option. Or, the operation of uploading the designated network product may be triggered by other operations, which is not limited in the present disclosure.

At 603, the server receives the designated network product sent by the first terminal, and determines a second terminal used by a friend user in a user relationship chain of the user using the first terminal.

At 604, the server sends the designated network product to the second terminal.

In some examples, the server may maintain the user relationship chain of each user, and each user relationship chain includes multiple friend users. For each user, the server may gather network products released by all friend users of the user in a web page, and send the web page to the terminal used by the user. The user may view the network products released by the friend users in the web page, and perform operations for the displayed network products.

When receiving the designated network product from the first terminal, the server may obtain the user relationship chain of the first terminal. For each friend user in the user relationship chain, the server may add the designated network product to a web page of the friend user to obtain an updated web page, and determine the second terminal used by the friend user. The server may send the updated web page to the second terminal proactively or after receiving an instruction of refreshing the web page from the second terminal. The second terminal may display the updated web page and the user may view the designated network product on the updated web page.

After determining the second terminal used by the friend user, the server may directly send the designated network product to the second terminal, and the second terminal may directly display the designated network product after receiving the designated network product. Or when receiving the designated network product, the second terminal may display a message notification to prompt the user to receive a new message. When the user clicks the message notification, the designed network product is displayed.

In some examples, the server may send the designated network product to the second terminal, so as to distribute the designated network product to the friend users. Before sending the designated network product, the server may configure an original lifetime of the designated network product, and the server may send the original lifetime of the designated network product to the second terminal when sending the designated network product to the second terminal.

It should be noted that, the server sending the designated network product and the original lifetime of the designated network product to the second terminal is taken as an example. In practical applications, the server may also send the designated network product and the original lifetime to the first terminal, and the first terminal may display the designated network product and the original lifetime.

At 605, after receiving the designated network product, the second terminal displays the designated network product on a preconfigured location and generates a behavior event according to an operation performed on the designated network product.

The preconfigured location may be the top of a web page currently displayed on the second terminal, or may be a message notification bar of the second terminal, which is not limited in the present disclosure.

When the designated network product is displayed on the second terminal, the user may perform operations on the designated network product. The second terminal may generate the behavior event corresponding to the operation of the user. The processing is similar with that at step 405 and will not be described herein.

At 606, the second terminal sends the behavior event to the server.

After generating the behavior event of the designated network product, the second terminal may send the generated behavior event to the server, so that the server may adjust the lifetime of the network product according to the behavior event.

At 607, after receiving the behavior event, the server adjusts the lifetime of the network product according to the behavior event.

In some examples, the user relationship chain of the first terminal may include multiple friend users, and the server may determine multiple second terminals used by the friend users according to the user relationship chain of the first terminal. Each of the multiple second terminals may generate and send the behavior events of the designated network product to the server. The server may adjust the lifetime of the designated network product according to the received behavior event every time when the behavior event is received. Or, the server may collect the behavior events sent by the multiple second terminals within a certain time period, obtain statistics of the behavior events, and adjust the lifetime of the designated network product according to the statistics. The processing of the server adjusting the lifetime of the designated network product according to the behavior events of the second terminals is similar with that described at 408 and 505, which will not described herein.

At 608, when the adjusted lifetime of the designated network product is larger than a preconfigured lifetime threshold, the server sends the adjusted lifetime of the designated network product to the first terminal and the second terminal.

The server may adjust the lifetime of the designated network product, and obtain the adjusted lifetime. The server may send the adjusted lifetime of the designated network product to the first terminal and the second terminal, so that the first terminal and the second terminal may display the adjusted lifetime of the designated network product. Hence, the user releasing the designated network product and the friend users of the user may view the adjusted lifetime of the designated network product via the terminals respectively.

At 609, after receiving the adjusted lifetime of the designated network product, the first terminal displays the designated network product and the adjusted lifetime of the designated network product on the preconfigured location of the first terminal.

At 610, after receiving the adjusted lifetime of the designated network product, the second terminal displays the designated network product and the adjusted lifetime of the designated network product on the preconfigured location of the second terminal.

In the example, the adjusted lifetime of the designated network product is larger than the preconfigured lifetime threshold. If the adjusted lifetime of the designated network product is less than or equal to the preconfigured lifetime threshold, the server may cancel the designated network product, and thus the first terminal and the second terminal cannot display the designated network product after refreshing the displayed network product.

Therefore, according to the network product display method provided by the present disclosure, the behavior events generated when the friend users perform the operations on the network product are collected and the lifetime of the network product is adjusted accordingly, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

Figure 7:
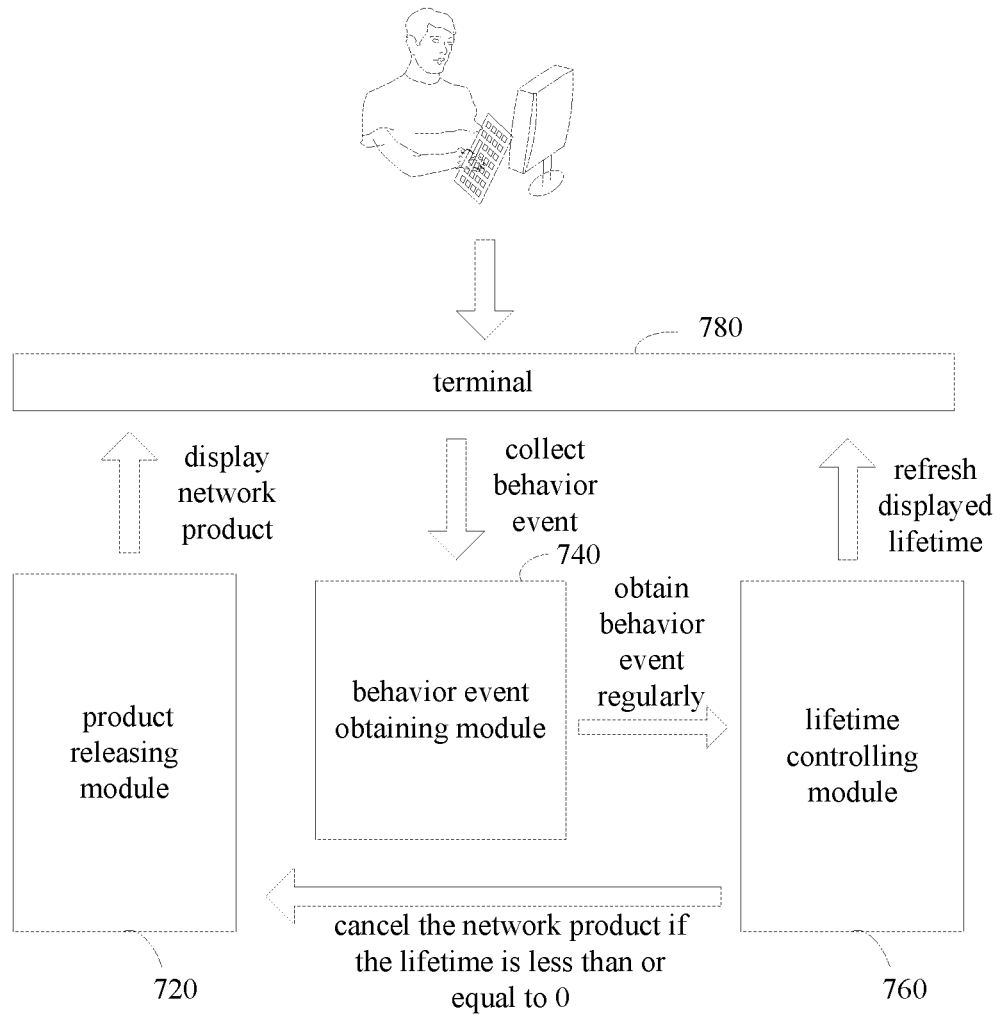
FIG. 7 is a schematic diagram illustrating a structure of a server according to various example of the present invention.

In a possible implementing mode, the network product display methods which are shown in FIGS. 4A, 5A and 6 and may be implemented in the server may be achieved by multiple modules configured in the server. FIG. 7 is a schematic diagram illustrating a structure of a server according to various example of the present invention. The server includes a product releasing module 720, a behavior event obtaining module 740 and a lifetime controlling module 760. The product releasing module 720 is to send a network product and a lifetime of the network product to a terminal 780. A user may view the network product displayed on the terminal 780 and perform an operation on the network product to generate a behavior event. The behavior event obtaining module 740 is to collect the behavior event generated by the terminal 780. The lifetime controlling module 760 is to adjust the lifetime of the network product according to the behavior event collected by the behavior event obtaining module 740, cancel the network product if the lifetime is less than or equal to 0, and send the lifetime to the terminal 780 if the lifetime is larger than 0, so that the terminal 780 may refresh the displayed lifetime of the network product.

The apparatus of the present disclosure is described hereinafter. Details may refer to the implementation of the corresponding methods.

Figure 8:
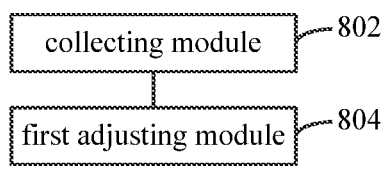
FIG. 8 is a schematic diagram illustrating a structure of a network product display apparatus according to an example of the present invention.

FIG. 8 is a schematic diagram illustrating a structure of a network product display apparatus according to an example of the present invention. In the example, the network product display apparatus is applied to the server 120 in the environment shown in FIG. 1. The network product display apparatus includes, but not limited to, a collecting module 802 and a first adjusting module 804.

The collecting module 802 is to collect a behavior event transmitted by at least one terminal. The behavior event is generated according to an operation on a displayed network product.

The first adjusting module 804 is to adjust a lifetime of the network product according to the behavior event collected by the collecting module 802. The lifetime is remaining display time of the network product.

Therefore, according to the network product display apparatus provided by the present disclosure, the behavior event generated according to the operation performed by the user on the network product is collected, and the lifetime of the network product is adjusted according to the collected behavior event, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

Figure 9:
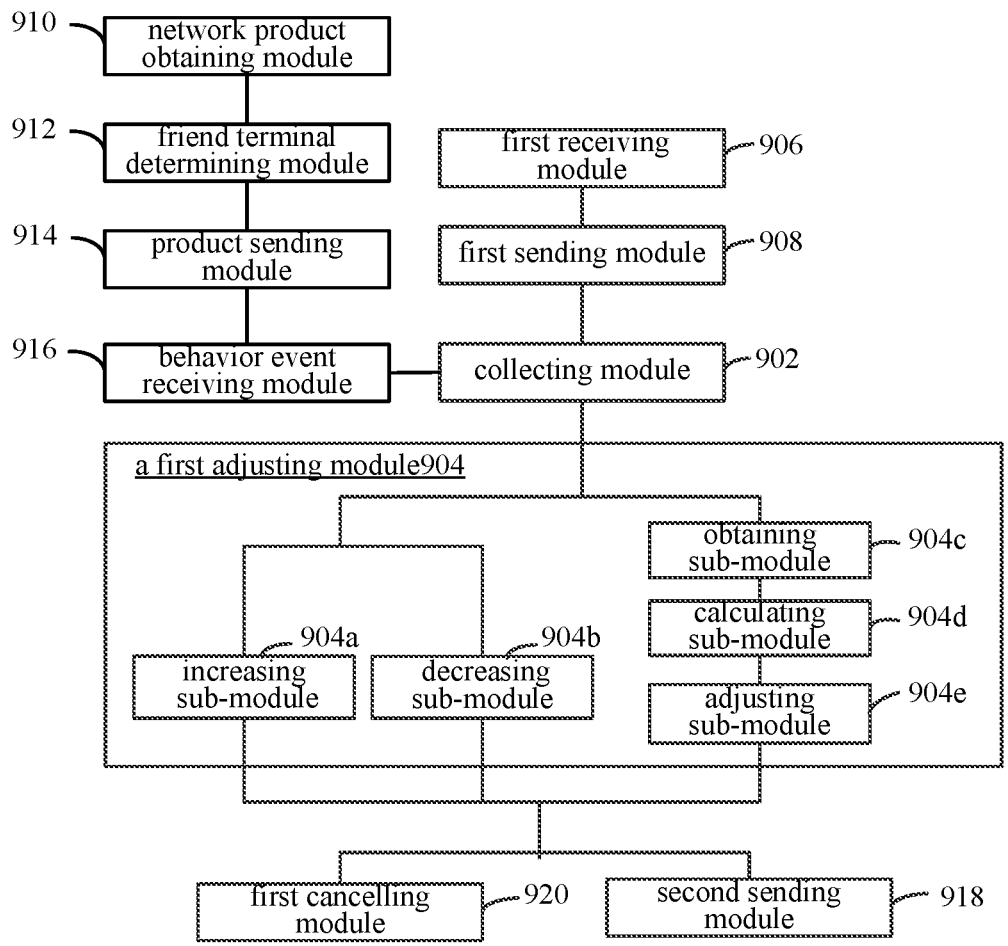
FIG. 9 is a schematic diagram illustrating a structure of a network product display apparatus according to another example of the present invention.

FIG. 9 is a schematic diagram illustrating a structure of a network product display apparatus according to another example of the present invention. In the example, the network product display apparatus is applied to the server 120 in the environment shown in FIG. 1. The network product display apparatus includes, but not limited to, a collecting module 902 and a first adjusting module 904.

The collecting module 902 is to collect a behavior event transmitted by at least one terminal. The behavior event is generated according to an operation on a displayed network product.

The first adjusting module 904 is to adjust a lifetime of the network product according to the behavior event collected by the collecting module 902. The lifetime is remaining display time of the network product.

In a first possible implementing mode of the example, the first adjusting module 904 may include an increasing sub-module 904a and a decreasing sub-module 904b.

The increasing module 904a is to, for each collected behavior event, increase the lifetime of the network product, if the behavior event is a preconfigured positive event which is a behavior event playing a positive role for increasing the lifetime.

The decreasing module 904b is to, for each collected behavior event, decrease the lifetime of the network product, if the behavior event is a preconfigured negative event which is a behavior event playing a negative role for increasing the lifetime.

In a second possible implementing mode of the example, the first adjusting module 904 may include an obtaining sub-module 904c, a calculating sub-module 904d and an adjusting sub-module 904e.

The obtaining sub-module 904c is to obtain all behavior events collected during a collecting period at a preset time point which arrives when a preset time interval expires each time or when the number of the collected behavior events reaches a preset number threshold.

The calculating sub-module 904d is to calculate a total occurrence number of each type of the behavior events collected by the obtaining sub-module 904c during the collecting period.

The adjusting sub-module 904e is to adjust the lifetime of the network product according to a preset algorithm and the total occurrence number of each type of the behavior events calculated by the calculating sub-module 904d.

In a third possible implementing mode of the example, the network product display apparatus further includes a first receiving module 906 and a first sending module 908.

The first receiving module 906 is to receive an obtaining request from any one terminal; the obtaining request is used to obtain the network product.

The first sending module 908 is to send the network product and the lifetime of the network product to the terminal sending the obtaining request, so that the terminal may display the network product and the lifetime of the network product on a preconfigured location.

In a fourth possible implementing mode of the example, the network product display apparatus further includes a network product obtaining module 910, a friend terminal determining module 912, a product sending module 914 and a behavior event receiving module 916.

The network product obtaining module 910 is to obtain a network product sending by a first terminal.

The friend terminal determining module 912 is to determine a second terminal used by a friend user in a user relationship chain of the first terminal.

The product sending module 914 is to send the network product to the second terminal, so that the second terminal may display the network product and return a behavior event generated according to an operation on the network product.

The behavior event receiving module 916 is to receive the behavior event returned by the second terminal.

In a fifth possible implementing mode of the example, the network product display apparatus further includes a second sending module 918 and a first cancelling module 920.

The second sending module 918 is to, when the lifetime adjusted by the first adjusting module is larger than a preconfigured lifetime threshold, send the adjusted lifetime to the terminal, so that the terminal may display the adjusted lifetime.

The first cancelling module 920 is to, when the lifetime adjusted by the first adjusting module is smaller than or equal to the preconfigured lifetime threshold, cancel the network product.

Therefore, according to the network product display apparatus provided by the present disclosure, the behavior event generated according to the operation performed by the user on the displayed network product is collected, the server may adjust the lifetime of the network product according to the collected behavior event, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

Figure 10:
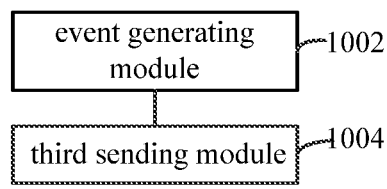
FIG. 10 is a schematic diagram illustrating a structure of a network product display apparatus according to another example of the present invention.

FIG. 10 is a schematic diagram illustrating a structure of a network product display apparatus according to another example of the present invention. In the example, the network product display apparatus is applied to the terminal 140 in the environment shown in FIG. 1. The network product display apparatus includes, but not limited to, an event generating module 1002 and a third sending module 1004.

The event generating module 1002 is to generate a behavior event according to an operation on a displayed network product.

The third sending module 1004 is to send the behavior event to the server, so that the server may adjust a lifetime of the network product according to the collected behavior event of the network product. The lifetime is remaining display time of the network product.

Therefore, according to the network product display apparatus provided by the present disclosure, the behavior event generated according to the operation performed by the user on the displayed network product is collected, the server may adjust the lifetime of the network product according to the collected behavior events, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

Figure 11:
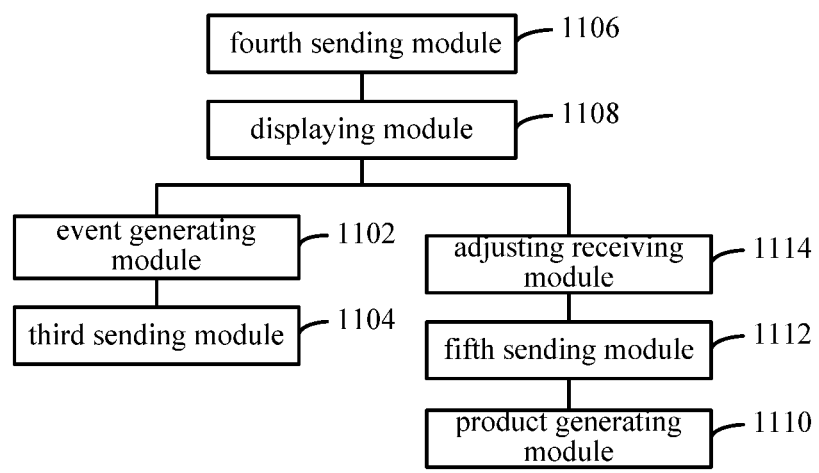
FIG. 11 is a schematic diagram illustrating a structure of a network product display apparatus according to another example of the present invention.

FIG. 11 is a schematic diagram illustrating a structure of a network product display apparatus according to another example of the present invention. In the example, the network product display apparatus is applied to the terminal 140 in the environment shown in FIG. 1. The network product display apparatus includes, but not limited to, an event generating module 1102 and a third sending module 1104.

The event generating module 1102 is to generate a behavior event according to an operation on a displayed network product.

The third sending module 1104 is to send the behavior event to the server, so that the server may adjust a lifetime of the network product according to the collected behavior event of the network product. The lifetime is a remaining display time of the network product.

In a first possible implementing mode of the example, the network product display apparatus further includes a fourth sending module 1106 and a displaying module 1108.

The fourth sending module 1106 is to send an obtaining request to the server; the obtaining request being used to obtain the network product, so that the server may send the network product and the lifetime of the network product.

The displaying module 1108 is to receive the network product and the lifetime of the network product, and display the network product and the lifetime of the network product on a preconfigured location.

In a second possible implementing mode of the example, the displaying module 1108 is further to receive an adjusted lifetime of the network product from the server, and display the adjusted lifetime on the preconfigured location; the adjusted lifetime being larger than the preconfigured lifetime threshold.

In a third possible implementing mode of the example, the network product display apparatus further includes a product generating module 1110, a fifth sending module 1112 and an adjusting receiving module 1114.

The product generating module 1110 is to generating a designated network product to be released.

The fifth sending module 1112 is to send the designated network product to the server, so that the server may determine a second terminal of a friend user in a user relationship chain of the first terminal, send the designated network product to the second terminal, receive a behavior event generated by the second terminal according to an operation on the designated network product, and adjust the lifetime of the designated network product.

The adjusting receiving module 1114 is to receive the designated network product and the adjusted lifetime of the designated network product from the server.

The displaying module 1108 is further to display the designated network product and the lifetime of the designated network product on the preconfigured location.

Therefore, according to the network product display apparatus provided by the present disclosure, the behavior event generated according to the operation performed by the user on the displayed network product is collected, the server may adjust the lifetime of the network product according to the collected behavior event, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

It should be noted that when network product display apparatus provided by the above examples displays the network product, the dividing of the above functional modules is only an example. In practical applications, the above functions may be distributed to different functional modules according to requirements, i.e. the internal structures of the server and terminal may be divided into different functional modules to implement part or all of the functions. In addition, the network product display apparatus and the network product display method provided by the above examples belong to the same idea, the detailed implementation of the network product display apparatus may refer to the method examples and will not described herein.

Figure 12:
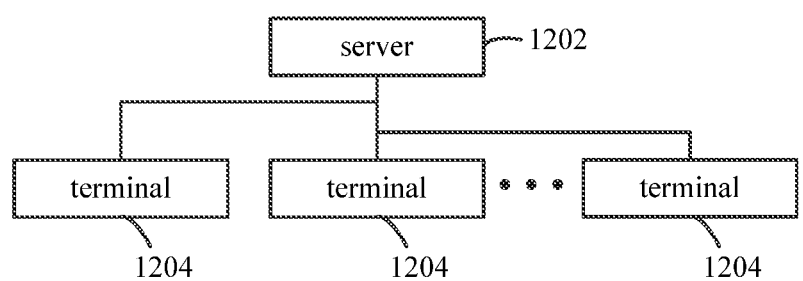
FIG. 12 is a schematic diagram illustrating a structure of a network product cancelling system according to an example of the present invention.

FIG. 12 is a schematic diagram illustrating a structure of a network product display system according to an example of the present invention. In the example, the network product display system is applied to the environment shown in FIG. 1. The network product display system includes the server 1202 and at least one of the terminal 1204.

The server 1202 may include the network product display apparatus shown in FIG. 8 or 9, and the terminal 1204 may include the network product display apparatus shown in FIG. 10 or 11.

Therefore, according to the network product display system provided by the present disclosure, the behavior event generated according to the operation performed by the user on the displayed network product is collected, the server may adjust the lifetime of the network product according to the collected behavior event, thereby solving the problem that a lot of burdens are caused to the server since numerous resources of the server are occupied when many network products are displayed by the server. In addition, the lifetime of the network product may be adjusted according to the behavior events performed by the user, if the network product is unpopular, the lifetime of the network product may be reduced, and the network product may be canceled when the lifetime is lower than a preconfigured lifetime threshold, thereby reducing the occupation of the service resources. After the unpopular network product is cancelled, it is easy for the user to find a popular network product, thereby improving efficiency of user search. Further, the lifetime of the network product may be adjusted according to selection of the user, and thus the enthusiasm of user to participate is improved, the survival of the fittest of the network products is realized, and popularity of the network product is improved.

Figure 13:
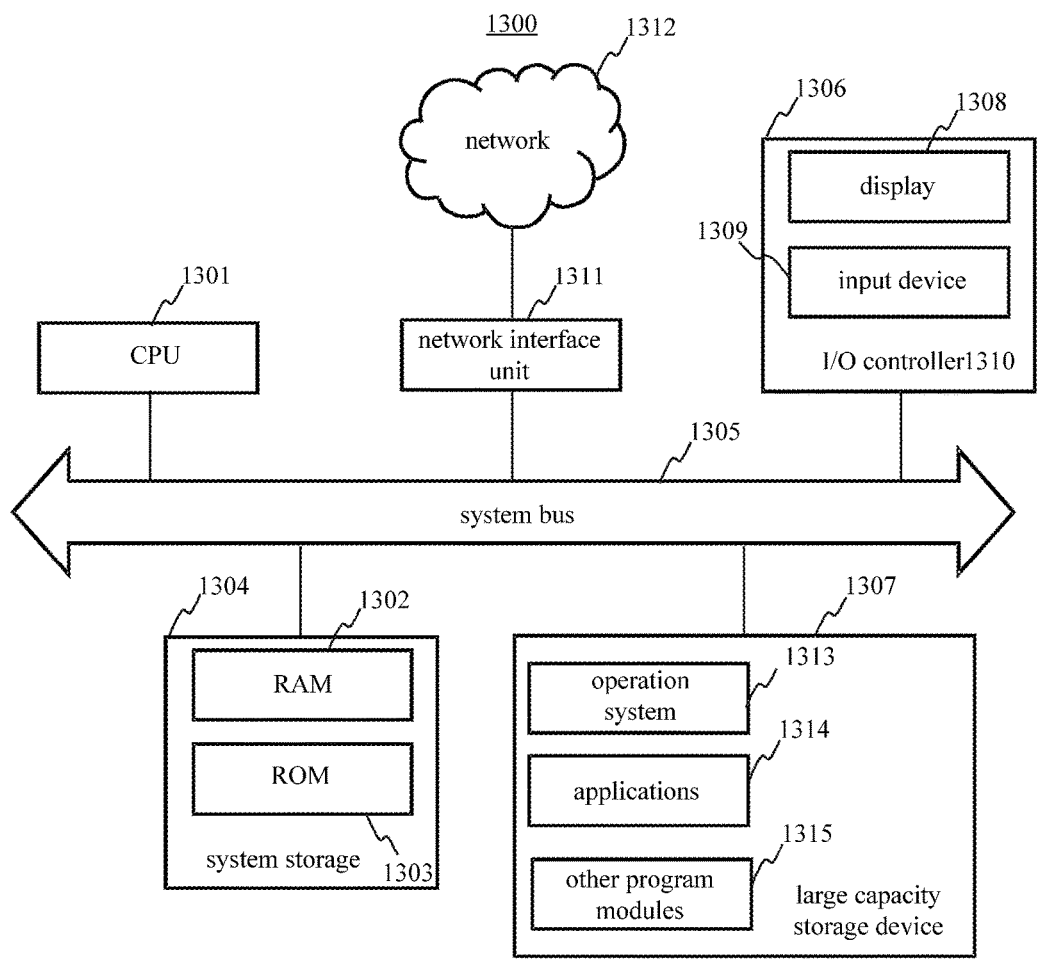
FIG. 13 is a schematic diagram illustrating a structure of a terminal according to an example of the present invention.

FIG. 13 is a schematic diagram illustrating a structure of a terminal according to an example of the present invention. The terminal 1300 may be a conventional desktop or laptop computer. The terminal 1300 includes a Central Processing Unit (CPU) 1301, a Random-Access Memory (RAM) 1302 and a read-only memory (ROM) 1303, system storage 1304, and a system bus 1305 connecting the system storage 1304 and the CPU 1301. The terminal 1300 further includes a basic input/output (I/O) system 1306 helping information communication between each device in the terminal, and a large capacity storage device 1307 storing an operation system, applications and other program modules.

The basic I/O system 1306 includes a display 1308 for displaying information and an input device 1309 for input information by the user. The input device 1309 may be a mouse or a keyboard. The display 1308 and the input device 1309 are connected to the CPU 1301 via an I/O controller 1310 which is connected to the system bus 1305. The basic I/O system 1306 may further include the I/O controller 1310 for receiving and processing the input from other devices, e.g. the keyboard, the mouse, or an electronic touch pen. Similarly, the I/O controller 1310 may further provide output to output device, e.g. the display, a scripter and etc.

The large capacity storage device 1307 is connected to the CPU 1301 via a large capacity storage controller (not shown) of the system bus 1305. The large capacity storage device 1307 and related terminal readable medium provide non-transitory storage functions for the terminal 1300. That is, the large capacity storage device 1307 may include terminal readable medium (not shown), e.g. a hardware, or a CD-ROM driver.

Without loss of generality, the computer readable medium may include a computer storage medium and communication medium. The computer storage medium may be transitory, non-transitory, movable or non-movable medium implemented by any method and technology which are used for store information, e.g. computer readable instructions, data structures, program modules and etc. The computer storage medium may be a RAM, ROM, EPROM, EEPROM, flash memory or other proper storage device, CD-ROM, DVD, or other optical storage device, tape or other magnetic storage device. Those skilled in the art know that the computer storage medium is not limited to the above types.

According the various examples of the present disclosure, the computer 1300 may be connected to a remote computer on a network via the network, e.g. the Internet. That is, the computer 1300 may be connected to the network 1312 via a network interface unit 1313 on the system bus 1305. In other words, the network interface unit 1313 may be used to connect the computer 1300 to a network of another type or a remote computer system (not shown).

Figure 14:
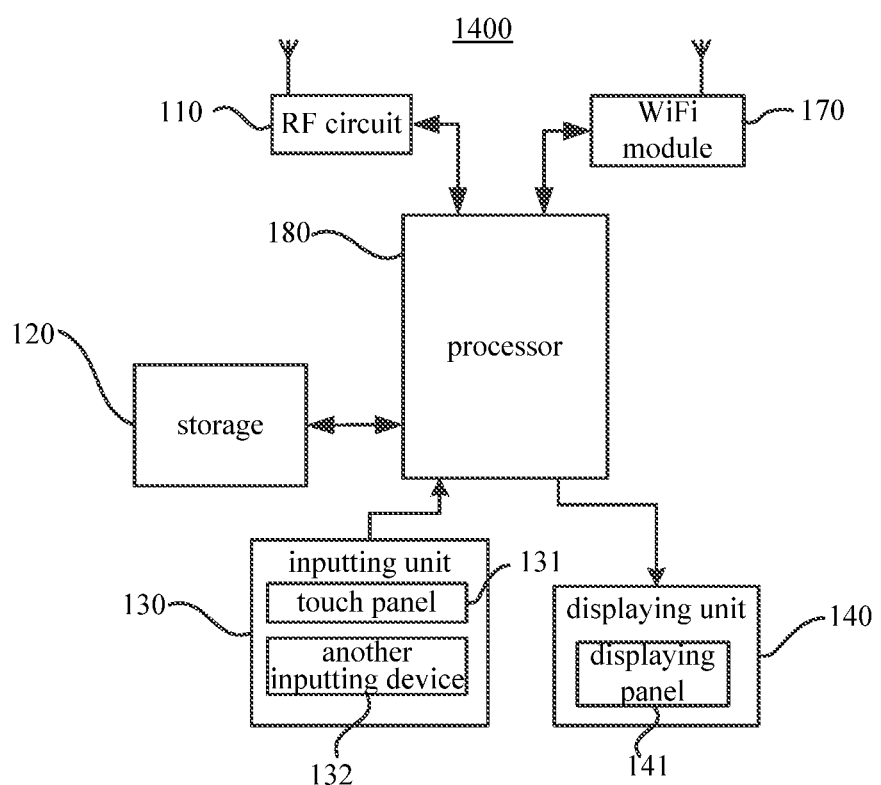
FIG. 14 is a schematic diagram illustrating a structure of a terminal according to another example of the present invention.

FIG. 14 is a schematic diagram illustrating a structure of a terminal according to another example of the present invention.

The terminal device 1400 may include a Radio Frequency (RF) circuit 110, storage 112 including at least one non-transitory machine-readable storage medium, an inputting unit 130, a displaying unit 140, a wireless fidelity (WiFi) module 170, a processor 180 including at least one processing core etc. The skilled in the art can know that the terminal device is not limited by a structure of the terminal device as shown in FIG. 14. In an embodiment, the terminal device may include more components or fewer components than that shown in FIG. 14, or the terminal device may combine some of the components or may have different arrangement of the components.

The RF circuit 110 is to transmit and receive signals in call processes or in processes of transmitting and receiving information. The RF circuit 110 is further to transmit downlink information received from a base station to the processor 180. In addition, the RF circuit 110 is to transmit uplink data to the base station. The RF circuit 110 includes, but is not limited to, an antenna, at least one amplifier, a tuner, at least one oscillator, a subscriber identity module (SIM) card, a transceiver, a coupler, a low noise amplifier (LNA), a diplexer etc. The RF circuit 110 communicates with a network or another communication device through wireless communication. Any of the following communication standards or protocols may be used in the wireless communication: Global System of Mobile communication (GSM), General Packet Radio Service (GPRS), Code Division Multiple Access (CDMA, Wideband Code Division Multiple Access (WCDMA), Long Term Evolution (LTE), Email, Short Messaging Service (SMS) etc.

The storage 112 is to store software program and modules. The processor 180 executes the software program and the modules stored in the storage 112 to perform function applications and data processing. The storage 112 may include a program storage area and a data storage area. The program storage area may store an operating system, application program corresponding to at least one function (e.g., a sound playing function, a video playing function). The data storage area may store data created when the terminal device 1400 is used (e.g., audio data, contact data). In addition, the storage 112 may include a high-speed random access memory, or the storage 112 may further include a non-transitory memory, such as at least one disk storage device, at least one flash memory device, or other volatile solid-state memory devices. The storage 112 may further include a memory controller, so that the processor 180 and the inputting unit 130 may access the storage 112.

The inputting unit 130 may receive an inputted number or character information, and generate an input signal of a key, a mouse, an operating rod, an optical or a track ball related with function control and user configuration. In an embodiment, the inputting unit 130 may include a touch panel 131 and another inputting device 132. The touch panel 131, which is also called a touch screen, may collect a touch operation performed by a user on or near the touch panel 131 (e.g., the user may perform an operation by using any suitable object or an accessory on or near the touch panel 131), and may drive a corresponding connection device according to preset program. In an embodiment, the touch panel 131 may include a touch detection apparatus and a touch controller. The touch detection apparatus is to detect a touch position, detect a signal generated by the touch operation, and transmit the signal to the touch controller. The touch controller is to receive touch information from the touch detection apparatus, convert the touch information to touch point coordinates, transmit the touch point coordinates to the processor 180, and receive a command from the processor 180 and execute the command. In an embodiment, the touch panel 131 is implemented by using a resistance-type, a capacitance-type, an infrared-type or a surface-acoustic-wave-type. Except the touch panel 131, the inputting unit 130 may further include another inputting device 132. The another inputting device 132 may include, but be not limited to, at least one of a physical keyboard, a function key (such as a volume control key, a key switch, etc.), a trackball, a mouse, and an operating rod.

The displaying unit 140 may display information inputted by the user, information provided to the user, or a graphical user interface of the terminal device. The graphical user interface may include at least one of a graphic, a character, an icon, video etc. The displaying unit 140 may include a displaying panel 141. In an embodiment, the displaying panel 141 is configured in a manner of Liquid Crystal Display (LCD), Organic Light-Emitting Diode (OLED). In an embodiment, the touch panel 131 may cover the displaying panel 141. When detecting the touch operation on or near the touch panel 131, the touch panel 131 transmits the touch operation to the processor 180 to determine a type of a touch event. Afterwards, the processor 180 provides a corresponding visual output in the displaying panel 141. Although the touch panel 131 and the displaying panel 141 are as two independent components to implement an inputting function and an outputting function, in some embodiments, the touch panel 131 and the displaying panel 141 may be integrated to implement the inputting function and the outputting function.

The WiFi belongs to short-range wireless transmission technology. By using the WiFi module 170 of the terminal device 600, the user may access a wireless broadband internet, transmit and receive an Email, browse a webpage and access streaming media. The wireless module 170 is shown in FIG. 6. It can be known that the WiFi module 170 is not an essential component of the terminal device, and may be omitted as requirements when not changing the nature of the present disclosure.

The processor 180 is a control center of the terminal device 600. The processor 180 is to connect all components of the terminal device via various interfaces and circuits, run the software program and/or module stored in the memory 120, call data stored in the memory 120, so as to execute various functions and perform data processing for the terminal device 600. In an embodiment, the processor 180 may include at least one processing core. In an embodiment, the processor 180 may include an application processor and a modem processor. The application processor processes an operation system, user interfaces and application programs. The modem processor processes wireless communication. It can be known that the modem processor may not be integrated in the processor 180.

The terminal device 600 may further include a camera, a blue tooth module, which is not illustrated in FIG. 14. In an embodiment, the displaying unit of the terminal device is touch screen display. The terminal device also includes storage and at least one program. The at least one program is stored in the storage and is executed by the at least one processor. The at least one program includes instructions for performing the operations described in the above examples.

The examples of the present invention also provide a computer readable storage medium which may the computer readable storage medium included in the storage of the above described examples or a single computer readable storage medium which is not set up in the terminal. The computer readable storage medium stores at least one program. The at least one program is executed by at least one processor to implement a network product display method. The method includes: generating a behavior event according to an operation on a displayed network product; and sending the behavior event to the server, so that the server may adjust an lifetime of the network product according to the collected behavior event of the network product; and the lifetime being remaining display time of the network product.

In an example, before generating the behavior event according to the operation on the displayed network product, the method further includes: sending an obtaining request to the server; the obtaining request being used to obtain the network product, so that the server may send the network product and the lifetime of the network product; receiving the network product and the lifetime of the network product; and displaying the network product and the lifetime of the network product on a preconfigured location.

In an example, after sending the behavior event to the server, the method further includes: receiving an adjusted lifetime of the network product from the server, the adjusted lifetime being larger than a preconfigured lifetime threshold; and displaying the adjusted lifetime on the preconfigured location.

In an example, the method further includes: generating a designated network product to be released; sending the designated network product to the server, so that the server may determine a second terminal used by a friend user in a user relationship chain of the first terminal, send the designated network product to the second terminal, receive a behavior event generated by the second terminal according to an operation on the designated network product, and adjust the lifetime of the designated network product; receiving the designated network product and the adjusted lifetime of the designated network product from the server; and displaying the designated network product and the adjusted lifetime of the designated network product on the preconfigured location.

Figure 15:
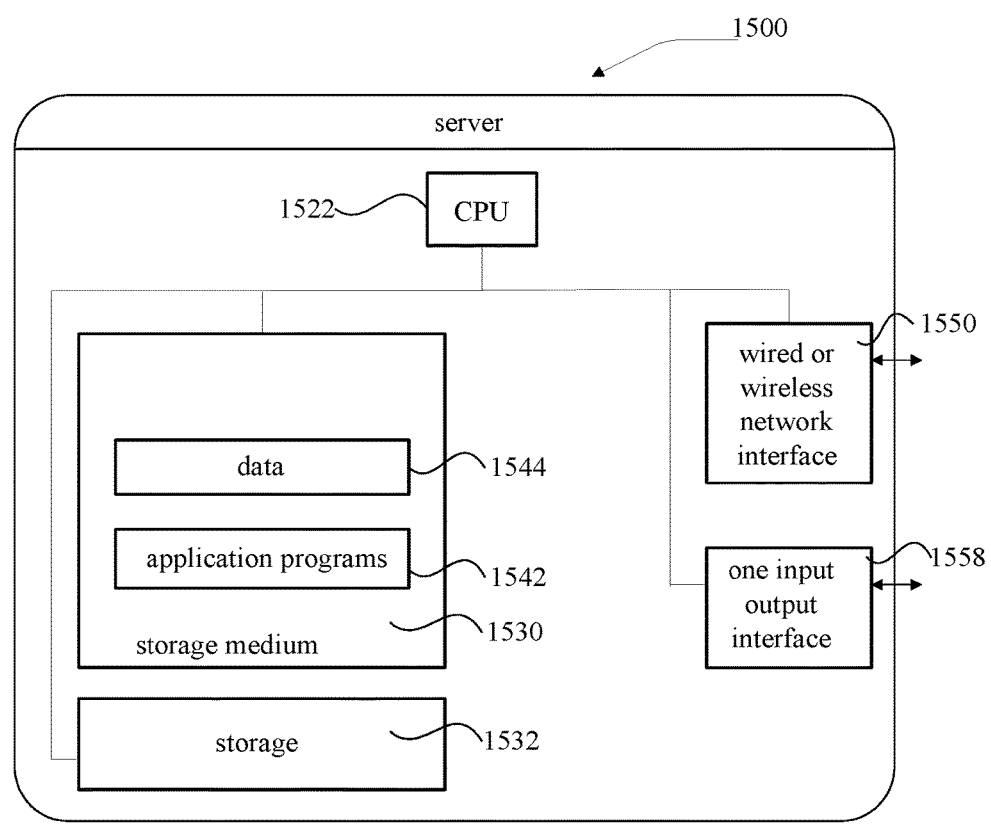
FIG. 15 is a schematic diagram illustrating a structure of a server according to an example of the present invention.

FIG. 15 is a schematic diagram illustrating a structure of a server according to an example of the present invention. Different servers 1500 may have different configurations or performances. The server 1500 may include at least one CPU 1522 (e.g. at least one processor) and a storage 1532, at least one storage medium 1530 (e.g. at least one mass storage device) for storing application programs 1542 and data 1544. The storage 1532 and the storage medium 1530 may be transient or persistent storage. The programs stored in the storage medium 1530 may include at least one module (not shown), and each module may include instruction operations in the server. Further, the CPU 1522 may be configured to communicate with the storage medium 1530 and execute the instruction operations in the storage medium 1530 on the server 1500.

The server 1500 may further include at least one wired or wireless network interface 1550, and at least one input output interface 1558.

The above examples of the present invention are only used for descriptions, which doesn't demonstrate good or better embodiment.

It can be understood by those skilled in the art that parts of or all of steps of the present invention can be realized by hardware or by instructing the hardware via programs. The program may be stored in a computer readable storage which may be a ROM, disk, and a CD etc.

The foregoing is only preferred examples of the present invention and is not used to limit the protection scope of the present invention. Any modification, equivalent substitution and improvement without departing from the spirit and principle of the present invention are within the protection scope of the present invention.

What is claimed is:

1. A network product display method, comprising:
   collecting a behavior event transmitted by at least one terminal; the behavior events being generated according to an operation on a network product displayed; and
   adjusting a lifetime of the network product according to the collected behavior event; the lifetime being remaining display time of the network product;
   wherein before collecting the behavior event transmitted by the at least one terminal, the network product display method further comprises:
      receiving an obtaining request from any terminal; the obtaining request being used to obtain the network product; and
      sending the network product and the lifetime of the network product to the terminal sending the obtaining request; the network product and the lifetime of the network product being displayed by the terminal sending the obtaining request on a preconfigured location.

2. The method of claim 1, wherein adjusting the lifetime of the network product according to the collected behavior event comprises at least one of:
   for each collected behavior event, increasing the lifetime of the network product if the behavior event is a preconfigured positive event; the preconfigured positive event being a behavior event playing a positive role for increasing the lifetime; or
   for each collected behavior event, decreasing the lifetime of the network product if the behavior event is a preconfigured negative event; the preconfigured negative event being a behavior event playing a negative role for increasing the lifetime.

3. The method of claim 1, wherein adjusting the lifetime of the network product according to the collected behavior event comprises:
   obtaining all behavior events collected during a collecting period at a preset time point; the preset time point arriving when a preset time interval expires each time or when the number of the collected behavior events reaches a preset number threshold;
   calculating a total occurrence number of each type of the behavior event collected during the collecting period; and
   adjusting the lifetime of the network product according to a preset algorithm and the total occurrence number of each type of the behavior event.

4. The method of claim 1, further comprising:
   before collecting the behavior event transmitted by the at least one terminal,
   obtaining a network product sending by a first terminal;
   determining a second terminal used by a friend user in a user relationship chain of the first terminal;
   sending the network product to the second terminal; the network product being displayed by the second terminal and a behavior event generated according to an operation on the network product being returned by the second terminal; and
   receiving the behavior event returned by the second terminal.

5. The method of claim 1, further comprising:
   after adjusting the lifetime of the network product according to the collected behavior event,
   if the adjusted lifetime is larger than a preconfigured lifetime threshold, sending the adjusted lifetime to the terminal; the adjusted lifetime being displayed by the terminal;

if the adjusted lifetime is smaller than or equal to the preconfigured lifetime threshold, cancelling the network product.

6. A network product display method, comprising:
generating a behavior event according to an operation on a network product displayed; and
sending the behavior event to a server; the server being used to adjust a lifetime of the network product according to the collected behavior event of the network product; the lifetime being remaining display time of the network product;
wherein the network product display method further comprises:
sending an obtaining request to the server; the obtaining request being used to obtain the network product; so that the server returns the network product and the lifetime of the network product;
receiving the network product and the lifetime of the network product; and
displaying the network product and the lifetime of the network product on a preconfigured location.

7. The method of claim 6, further comprising:
after sending the behavior event to the server,
receiving the adjusted lifetime of the network product from the server; the adjusted lifetime being larger than a preconfigured lifetime threshold; and
displaying the adjusted lifetime on the preconfigured location.

8. The method of claim 6, further comprising:
generating a designated network product to be released;
sending the designated network product to the server; the server being used to determine a second terminal used by a friend user in a user relationship chain of the first terminal, send the designated network product to the second terminal, receive a behavior event generated by the second terminal according to an operation on the designated network product, and adjust a lifetime of the designated network product;
receiving the designated network product and the adjusted lifetime of the designated network product from the server; and
displaying the designated network product and the adjusted lifetime of the designated network product on the preconfigured location.

9. A network product display apparatus, comprising: a hardware processor and memory storing instructions that when executed by the hardware processor, cause the hardware processor to:
collect a behavior event transmitted by at least one terminal, the behavior event being generated according to an operation on a displayed network product; and
adjust a lifetime of the network product according to the behavior event collected by the collecting module, the lifetime being remaining display time of the network product;
wherein the instructions further cause the hardware processor to:

receive an obtaining request from any one terminal; the obtaining request being used to obtain the network product;
send the network product and the lifetime of the network product to the terminal sending the obtaining request; the terminal sending the obtaining request being used to display the network product and the lifetime of the network product on a preconfigured location.

10. The apparatus of claim 9, wherein the instructions to adjust a lifetime of the network product further causes the hardware processor to:
for each collected behavior event, increase the lifetime of the network product if the behavior event is a preconfigured positive event; the preconfigured positive event being a behavior event playing a positive role for increasing the lifetime;
for each collected behavior event, decrease the lifetime of the network product if the behavior event is a preconfigured negative event; the preconfigured negative event being a behavior event playing a negative role for increasing the lifetime.

11. The apparatus of claim 9, wherein the instructions to adjust a lifetime of the network product further causes the hardware processor to:
obtain all behavior events collected during a collecting period at a preset time point which arrives when a preset time interval expires each time or when the number of the collected behavior events reaches a preset number threshold;
calculate a total occurrence number of each type of the behavior events collected by the obtaining sub-module 904c during the collecting period,
adjust the lifetime of the network product according to a preset algorithm and the total occurrence number of each type of the behavior events calculated by the calculating sub-module.

12. The apparatus of claim 9, wherein the instructions further cause the hardware processor to:
obtain a network product sending by a first terminal;
determine a second terminal used by a friend user in a user relationship chain of the first terminal;
send the network product to the second terminal; the second terminal being used to display the network product and return a behavior event generated according to an operation on the network product; and
receive the behavior event returned by the second terminal.

13. The apparatus of claim 9, wherein the instructions further cause the hardware processor to:
send the adjusted lifetime to the terminal when the lifetime adjusted by the first adjusting module is larger than a preconfigured lifetime threshold; the terminal being used to display the adjusted lifetime; and
cancel the network product when the lifetime adjusted by the first adjusting module is smaller than or equal to the preconfigured lifetime threshold.

* * * * *